United States Patent
Bromand et al.

(10) Patent No.: US 12,444,422 B2
(45) Date of Patent: Oct. 14, 2025

(54) METHOD AND SYSTEM FOR SELECTING A VOICE ASSISTANT

(71) Applicant: Spotify AB, Stockholm (SE)

(72) Inventors: Daniel Bromand, Boston, MA (US); Björn Erik Roth, Stockholm (SE)

(73) Assignee: Spotify AB, Stockholm (SE)

( * ) Notice: Subject to any disclaimer, the term of this patent is extended or adjusted under 35 U.S.C. 154(b) by 257 days.

(21) Appl. No.: 18/090,081

(22) Filed: Dec. 28, 2022

(65) Prior Publication Data
US 2024/0221754 A1   Jul. 4, 2024

(51) Int. Cl.
| G10L 15/32 | (2013.01) |
| G10L 15/01 | (2013.01) |
| G10L 15/08 | (2006.01) |
| G10L 15/22 | (2006.01) |

(52) U.S. Cl.
CPC .............. *G10L 15/32* (2013.01); *G10L 15/01* (2013.01); *G10L 15/08* (2013.01); *G10L 15/22* (2013.01); *G10L 2015/088* (2013.01)

(58) Field of Classification Search
CPC ......... G10L 15/32; G10L 15/01; G10L 15/08; G10L 15/22; G10L 2015/088; H04L 51/214; H04L 51/02; G06F 3/167
See application file for complete search history.

(56) References Cited

U.S. PATENT DOCUMENTS

| 10,748,543 | B2 | 8/2020 | Mixter et al. |
| 10,971,158 | B1 * | 4/2021 | Patangay ................. H04L 67/10 |
| 11,062,702 | B2 | 7/2021 | Wood et al. |
| 11,783,831 | B1 * | 10/2023 | Lantin ..................... H04L 9/14 |
| | | | 704/275 |
| 2018/0061420 | A1 | 3/2018 | Patil et al. |
| 2019/0244601 | A1 * | 8/2019 | Rusak .................. G10L 15/063 |
| 2019/0341037 | A1 | 11/2019 | Bromand et al. |
| 2020/0105273 | A1 | 4/2020 | O'Donovan |
| 2020/0135200 | A1 | 4/2020 | Taparia et al. |
| 2020/0152176 | A1 | 5/2020 | Eraslan et al. |
| 2020/0320997 | A1 | 10/2020 | Wagatsuma et al. |
| 2021/0074299 | A1 * | 3/2021 | Hwang ............. G06F 16/90332 |
| 2021/0329165 | A1 * | 10/2021 | Liu ..................... G06F 21/6245 |
| 2021/0342410 | A1 * | 11/2021 | Zhou .................. H04L 43/0894 |
| 2022/0180867 | A1 | 6/2022 | Bobbili et al. |
| 2023/0111618 | A1 * | 4/2023 | Sharifi .................. G10L 15/065 |
| | | | 704/235 |

FOREIGN PATENT DOCUMENTS

| CN | 109712624 A | 5/2019 |
| TW | I683306 B | 1/2020 |
| WO | 2022/067345 | 3/2022 |

* cited by examiner

*Primary Examiner* — Mark Villena
(74) *Attorney, Agent, or Firm* — McDonnell Boehnen Hulbert & Berghoff LLP

(57) ABSTRACT

A method for processing voice input is disclosed. The method may be performed by a device including a voice assistant manager and a plurality of voice assistants. In some embodiments, the method includes receiving an utterance from a user, detecting a category of the utterance, and communicating the utterance to a selected voice assistant of the plurality of voice assistants. The selected voice assistant may be associated with the detected category. In some embodiments, the selected voice assistant may generate a response to utterance, and the response may be output to the user.

15 Claims, 18 Drawing Sheets

METHOD AND SYSTEM FOR SELECTING A VOICE ASSISTANT

BACKGROUND

A user may interact with a voice assistant by providing a voice input that includes a request. For example, the user may ask the voice assistant to play media content, message a friend, or schedule an appointment. The voice assistant may process the request and generate a response. However, one voice assistant may not have all the functionality desired by a user, so a user may interact with more than one voice assistant.

Various challenges arise when a user may interact with multiple voice assistants. One set of challenges relates to managing the voice assistants. For example, coordinating and routing communication between a user and the voice assistants may be a challenge, particularly when more than one voice assistant may be involved in fulfilling a request. As another example, managing an addition, removal, or change of a voice assistant may be a challenge as the number of available voice assistants increases. Another set of challenges may relate to user confusion or user mistakes. For example, if there are multiple voice assistants available, the user may not know which assistant to direct a request to, the user may not know how to access one or more assistants, or the user may make a mistake regarding the functionality of a voice assistant. For instance, the user may accidentally call one voice assistant when another would have been better equipped to handle a request.

SUMMARY

In general terms, this disclosure relates to a method and device for processing a voice input. In some examples, the system includes a voice assistant manager and a plurality of voice assistants. In some embodiments and by non-limiting example, the voice assistant manager may receive an utterance from a user and detect a category associated with utterance. Based on the utterance, the voice assistant manager may, in some embodiments, select a voice assistant associated with the detected category and send the utterance to the selected voice assistant. In some embodiments, the voice assistant manager may send the utterance to a plurality of selected assistants.

One aspect is a method for processing voice input from a user. The method comprises receiving an utterance from the user at a computing device; determining a category of the utterance; selecting an assistant from a plurality of voice assistants; communicating the utterance to the selected assistant; and transmitting a response from the selected assistant to the user; wherein the category belongs to a plurality of categories; wherein determining the category of the utterance comprises inputting the utterance into a category detection model; and wherein selecting the assistant from the plurality of voice assistants comprises determining that the selected assistant is associated with the category.

Another aspect is a device for processing voice input including a processor and memory storing instructions. The instructions, when executed by the processor, cause the device to receive an utterance from a user; detect a wake word in the utterance; determine, from a plurality of categories, a category of the utterance; select an assistant from a plurality of voice assistants; and communicate the utterance to the selected assistant; wherein selecting the assistant from the plurality of assistants comprises determining that the selected assistant is associated with the category.

A further aspect is a device for processing a voice input, the device including a voice assistant manager, a plurality of voice assistants, a processor, and a memory coupled to the processor. The memory stores instructions that, when executed by the processor, cause the voice assistant manager to receive the utterance from a user; determine a category of the utterance; select an assistant from the plurality of voice assistants, wherein the assistant is associated with the category; and communicate the utterance to the selected assistant; wherein the instructions, when executed by the processor, cause the selected assistant to receive the utterance; and generate a response to the utterance.

DETAILED DESCRIPTION

Figure 1:
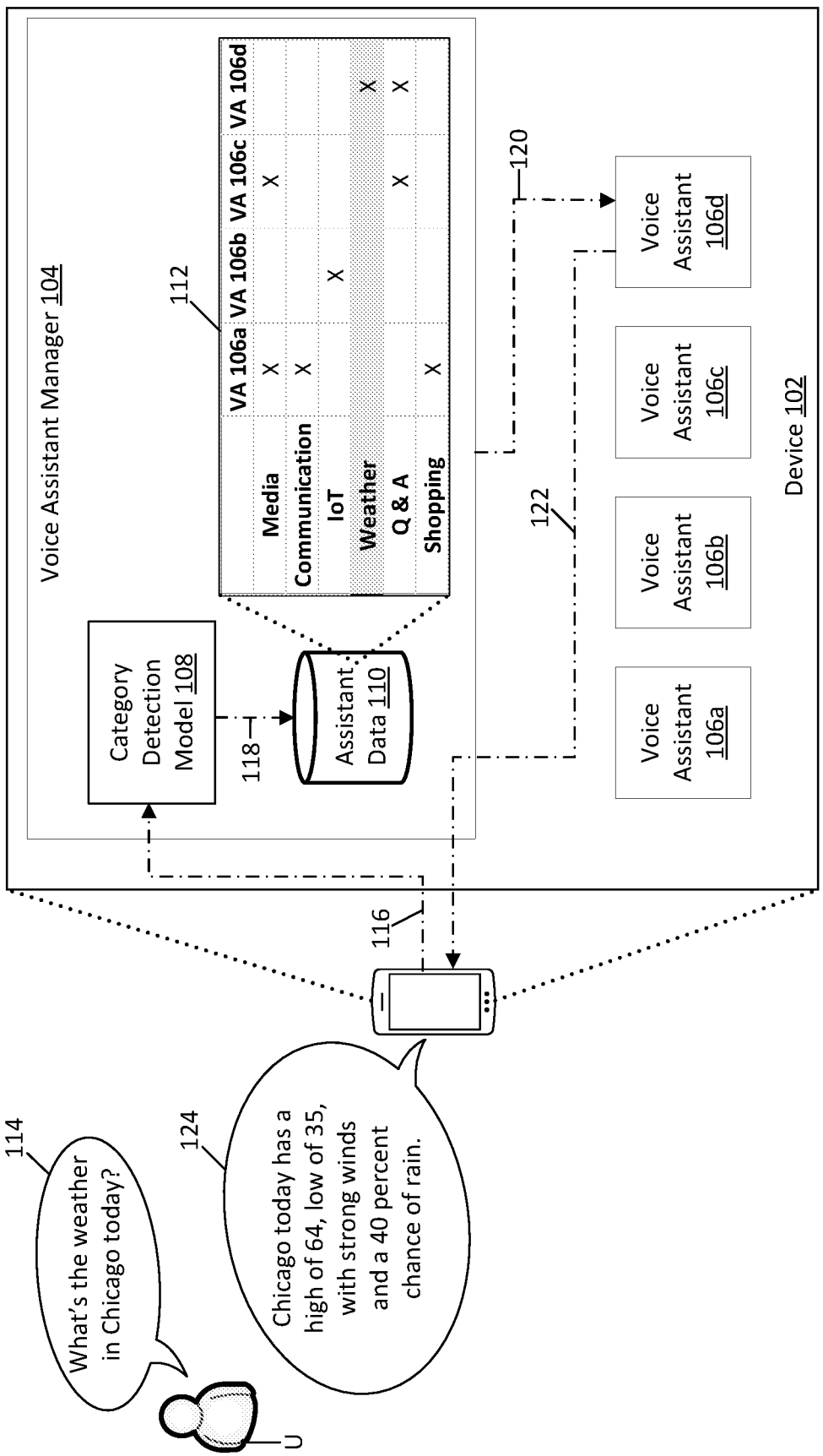
FIG. 1 illustrates an example of processing a voice input.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an example 100 of processing a voice input. The example 100 includes a device 102 and a user U. In the example shown, the device 102 includes a voice assistant manager 104 (which includes the components 108-112) and a plurality of voice assistants 106a-d. In the example shown, the user U speaks the utterance 114 (e.g., a voice input), which is received and processed by the device 102, as illustrated by the operations 116-122. In the example shown, the device 102 outputs the response 124.

The device 102 may be a computing device including a processor, memory, input and output components, non-transitory computer-readable media, and other computer components. An example of a computer system in which aspects of the device 102 may be implemented is further described below in connection with FIG. 18. In some embodiments, the device 102 may be a mobile device, such as a mobile phone, tablet, or smart device. In some embodiments, the device 102 may be a smart speaker. In some embodiments, the device 102 may be a device that is integrated into another system, such as a device that is embedded into a digital dashboard or into another car system. An example of the device 102 is illustrated and described below in connection with FIGS. 4-8 as the example device 200. The device 102 may include components for receiving, processing, and responding to a voice input. These components may include the voice assistant manager 104 and the plurality of voice assistants 106a-d.

The voice assistant manager 104 may be installed, as shown in the example of FIG. 1, on the device 102. The voice assistant manager 104 may perform operations related to processing voice requests and to managing voice assistants. In some examples, the voice assistant manager 104 may, among other things, determine a category of an utterance, communicate an utterance to an appropriate voice assistant of the plurality of voice assistants 106a-d, and manage subscriptions of the voice assistants 106a-d. Aspects of the voice assistant manager 104 are further described below in connection with 9-17. In some embodiments, the voice assistant manager 104 may be coupled to each of the voice assistants 106a-d. In some embodiments, the voice assistant manager 104 may be configured to communicate with the voice assistants 106a-d using the Matter protocol. Furthermore, the voice assistant manager 104 may include a category detection model 108, voice assistant data 110, and category-VA data 112.

The category detection model 108 may be a model that receives a voice input (e.g., an utterance) and determines a category of the voice input. The category detection model 108 may be software, hardware, or a combination of software and hardware. The voice assistant manager 104 may use the category detection model 108 to detect a category that an incoming utterance relates to. In some embodiments, the category detection model 108 may use machine learning techniques to perform natural language processing tasks for detecting a category. The category detection model 108 is further described below in connection with FIG. 9.

The voice assistant data 110 may include data related to the voice assistants 106a-d. For example, the voice assistant data 110 may include category-voice assistant (VA) data 112. The category-VA data 112 includes data that indicates what voice assistants of the voice assistants 106a-d are associated with what categories or functionalities. The voice assistant data 110 and the category-VA data 112 are further described below in connection with FIGS. 9-10.

Each voice assistant of the voice assistants 106a-d may include a service that can receive and process a voice request. In some embodiments, the plurality of voice assistants 106a-d may be installed, as shown in the example of FIG. 1, on the device 102. In some embodiments, one or more of the plurality of voice assistants 106a-d may not be installed on the device 102, but may be communicatively coupled to the device 102 via a local network. Further, one or more of the plurality of voice assistants 106a-d may be configured to send and receive communications pursuant to the Matter protocol. As shown, the device 102 may include a plurality of voice assistants, and voice assistants may be added to or removed from the device 102. Although illustrated with four assistants in the example of FIG. 1, there may be more or fewer voice assistants. For example, there may be two to three voice assistants, or there may be more than four voice assistants. Example voice assistants include Siri, Alexa, Cortana, Google Assistant, Hey Spotify, or other services that may interact with a user via voice.

In some embodiments, each of the voice assistants 106a-d may be associated with one or more categories. In some embodiments, if a voice assistant is associated with a category, the voice assistant may be able to process requests that are related to that category. In some embodiments, if a voice assistant is associated with a category, the voice assistant may be capable of performing one or more actions related to that category. In some embodiments, the voice assistant manager 104 may include data indicating what voice assistants are associated with what categories (e.g., the category-VA data 112). In some embodiments, each voice assistant of the voice assistants 106a-d may be associated with one or more wake words, which a user may use to call a specific voice assistant. Furthermore, one or more of the voice assistants 106a-d may be associated with a cloud service communicatively coupled with the device 102. Aspects of the voice assistants 106a-d are further described below. Depending on the embodiments, the voice assistants 106a-d and the voice assistant manager 104 may be implemented as software, hardware, or a combination of software and hardware.

The user U may be a person or system that generates speech. For example, the user U may speak an utterance. An utterance may be a voice input that includes a wake word and a request. A request may include an action and one or more parameters. Furthermore, an utterance may relate to one or more categories. In the example 100, the user U speaks the utterance 114, which asks, "What's the weather in Chicago today?". The device 102 may receive and process the utterance 114, as illustrated by the example operations 116-122.

As illustrated by the operation 116, the device 102 may, among other things, receive the utterance 114, and the utterance 114 may be processed by the voice assistant manager 104. In the example shown, the category detection model 108 may receive the utterance 114. At the category detection model 108, the voice assistant manager 104 may determine a category of the utterance 114. Determining a category of an utterance is further described below in connection with the decision 304 of FIG. 12. In the example shown, the voice assistant manager 104 may determine that the utterance 114 relates to the category "Weather."

As illustrated by the operation 118, the voice assistant manager 104 may use the assistant data 110 to further process the utterance 114. For example, the voice assistant manager 104 may determine which of the voice assistants 106a-d is associated with the detected category of the utterance 114. For example, based on the category-VA data 112, the voice assistant manager 104 may determine that the voice assistant 106d is associated with the category "Weather."

As illustrated by the operation 120, the voice assistant manager 104 may communicate the utterance 114 to the voice assistant 106d. The voice assistant 106d may receive and process the utterance 114. In some embodiments, the voice assistant 106d may use an associated cloud service to process the utterance 114. In some embodiments, the voice assistant 106d may generate a response.

As illustrated by the operation 122, the voice assistant 106*d* may transmit a response to the user U. In the example shown, the voice assistant 106*d* may transmit the response to the voice assistant manager 104, which may then transmit the response to the user U. The response may include text that is to be output as speech by the device 102. In the example 100, the response may be output by the device 102. For example, the device 102 may output the response 124, which states, "Chicago today has a high of 64, low of 35, with strong winds and a 40 percent chance of rain."

As illustrated by the example 100, the device 102 may include a plurality of voice assistants that may be available to a user. As shown, the voice assistants may differ from one another and offer functionality or functionalities related to different categories. Thus, a user may direct utterances related to any one of a number of distinct categories at the device 102. Yet still, because the voice assistant manager 104 may detect a category of an utterance and route the utterance to the appropriate voice assistant, the user U, in some embodiments, does not need to know a wake word of an assistant in order to call it. Furthermore, the user U need not, in some embodiments, know that a voice assistant is available on the device before using the voice assistant. As a result, the voice assistants 106*a-d* and the device 102 provide an improved user experience. Yet still, the device 102 may provide responses that are better tailored to a user's utterance, because the voice assistant manager 104 may select the voice assistant that is configured to respond to the content of the request sent by the user U.

Figure 2:
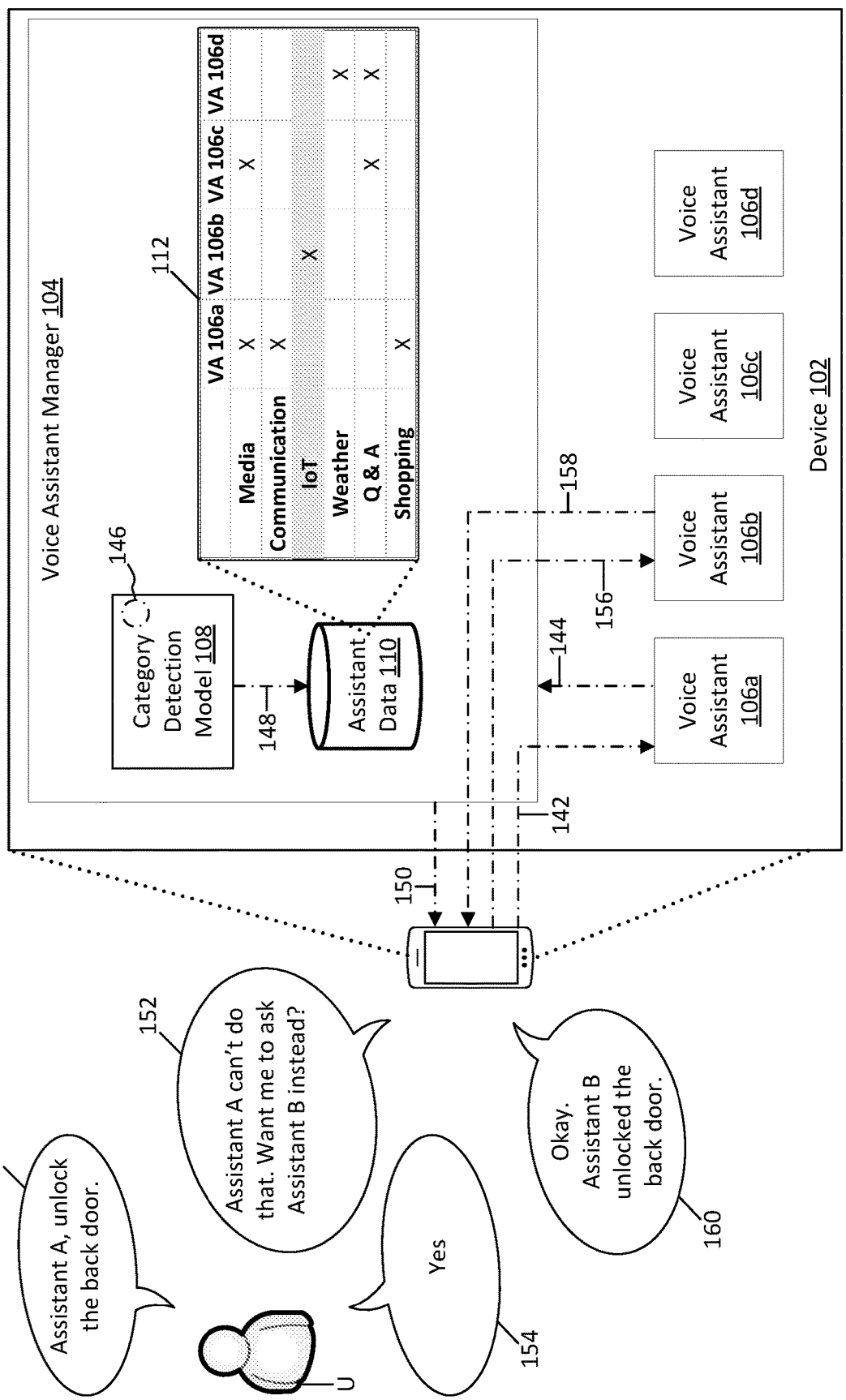
FIG. 2 illustrates an example of processing a voice input.

FIG. 2 illustrates an example 138 of processing a voice input. The example 138 includes the user U and the device 102. The device 102 includes the voice assistant manager 104 and the plurality of voice assistants 106*a-d*. In the example shown, the voice assistant manager 104 includes the category detection model 108, the assistant data 110, and the category-VA data 112. In the example 138, the user U speaks the utterances 140 and 154. The device 102 processes the utterances 140 and 154, as illustrated by the operations 142-150 and 156-158, and the device outputs the responses 152 and 160.

In the example shown, the user U speaks the utterance 140, which states, "Assistant A, unlock the back door." The utterance 140 includes a wake word: "Assistant A". As described above, a wake word (or wake phrase) may be used to call one of the voice assistants 106*a-d*. In some examples, the wake word may be related to a name of one of the voice assistants 106*a-d*. As described further below (e.g., in connection with FIGS. 14-15), the voice assistant manager 104 may detect a wake word and send the utterance to an assistant associated with that wake word.

For example, as illustrated by the operation 142, the voice assistant manager 104 may detect the wake word "Assistant A," determine that the wake word "Assistant A" is associated with the voice assistant 106*a* and communicate the utterance 140 to the voice assistant 106*a*. The voice assistant 106*a* may receive and process the utterance 140. In the example shown, however, the voice assistant 106*a* is not configured to handle requests related to IoT devices (e.g., Internet of Things devices, such as smart devices that may communicate with a controller or other system via the internet). As a result, the voice assistant 106*a* may not be able to fulfill the request of the utterance 140. In some embodiments, the category-VA data 112 may include a device communication category, which may include, among other things, communicating with IoT devices, electronic apparatuses communicatively coupled to the device 102, or other devices that may interact, either directly or indirectly with one or more of the voice assistants 106*a-d*.

As illustrated by the operation 144, the voice assistant 106*a* may generate a response to the utterance 140. For example, the voice assistant 106*a* may generate an error that indicates that the voice assistant 106*a* is unable to fulfill the request in the utterance 140. In the example shown, the voice assistant 106*a* may transmit the error to the voice assistant manager 104, which may receive the error. In response to receiving the error, the voice assistant manager 104 may determine which, if any, of the voice assistants may fulfill a request of the utterance 140.

As illustrated by the operation 146, the voice assistant manager 104 may use the category detection model 108 to determine a category of the utterance 140, a process that is further described below. In the example shown, the category detection model 108 may determine that a category of the utterance 140 is IoT devices. In some embodiments, the category of IoT devices may include interacting with smart devices at a home, such as locking or unlocking a door.

As illustrated by the operation 148, the voice assistant manager 104 may use the assistant data 110 to determine which of the plurality of voice assistants 106*a-d* is associated with the detected category (e.g., IoT devices). For example, the voice assistant manager 104 may determine that the voice assistant 106*b* may be associated with the category of IoT devices and, thus, may be configured to a handle a request related to managing IoT devices.

As illustrated by the operation 150, the voice assistant manager 104 may generate a response to the user U. For example, the response may include aspects of the error received from the voice assistant 106*a*. Furthermore, the response may ask whether the user U would like to communicate the utterance to a voice assistant that is more likely able to fulfill a request of the utterance 140, as determined by the operations 146-148. In some embodiments, the response may be audio output by the device 102 (e.g., aspects of the device 102 may perform an audio synthesis process to generate audio output using data generated by the voice assistant manager 104). In some embodiments, the response may be a visual output (e.g., as content displayed on a screen of the device 102). In some embodiments, the response may be a combination of audio and video outputs (e.g., both a display on the device 102 and synthesized audio).

For example, voice assistant manager 104 may cause the device 102 to output the response 152, which states, "Assistant A can't do that. Want me to ask Assistant B instead?" As shown, the response 152 asks the user whether the user U would like to communicate a request of the utterance 140 to the voice assistant 106*b*. In response, the user U may grant the voice assistant manager 104 permission to communicate the utterance 140 (or parts of the utterance 140) to the voice assistant 106*b*, as illustrated by the utterance 154, which states, "Yes." In some embodiments, if the user U does not grant the voice assistant manager 104 permission to communicate the communication to the voice assistant 106*b*, then the voice assistant manager 104 will not do so and data related to the utterance 140, to the operations 142-150, and to the response 152 may be deleted.

As illustrated by the operation 156, the device 102 and the voice assistant manager 104 may receive a confirmation (e.g., "Yes") from the user U, and may communicate data to the voice assistant 106*b*, such as data related to the request of the utterance 140. The voice assistant 106*b* may receive the data and process the request. For example, the voice assistant 106*b* may determine a request (e.g., "unlock the back door"), fulfill the request, and generate a response. For example, the voice assistant 106b may unlock a back door associated with the user U. In some embodiments, the voice assistant 106b may be communicatively coupled with a cloud service, which may fulfill and process the request.

As illustrated by the operation 158, the voice assistant 106b may generate and transmit a response. For example, the response may include data requested by the user U, the response may indicate that a request was or was not fulfilled, and the response may include other data related to the request or the processing of the request (e.g., a confirmation that a request was fulfilled, data for use in a text-to-speech process, answers to one or more queries, metadata, an indication of whether a third-party service was used, etc.). In the example shown, the voice assistant 106b may transmit the response to the voice assistant manager 104, which may transmit the response to the user. However, in other embodiments, the voice assistant 106b may output a response directly to the user U, without first sending the response to the voice assistant manager 104. In the example shown, the response is output by the device 102 as the response 160, which states, "Okay. Assistant B unlocked the back door."

As illustrated by the example 138, aspects of the present disclosure may recognize a wake word of the utterance and communicate the utterance to a voice assistant associated with a wake word, thereby allowing a user, in some instances, to select which voice assistant to interact with. However, aspects of the disclosure may also intelligently respond to the situation in which the user sends a request to a voice assistant that cannot handle the request. As a result, in some embodiments, the user does not need to resend the request to have it fulfilled. Furthermore, in some embodiments, the user may access a voice assistant that is better suited to respond to the user's request. Yet still, a user's mistake regarding voice assistant functionality may be efficiently detected and corrected. Yet still, the user's privacy is respected because the voice assistant manager 104 asks permission, in some examples, to use the selected assistant. Furthermore, as illustrated by the example 138, the device 102 may integrate voice assistants that are selected based on wake words and that are selected based on functionality.

Figure 3:
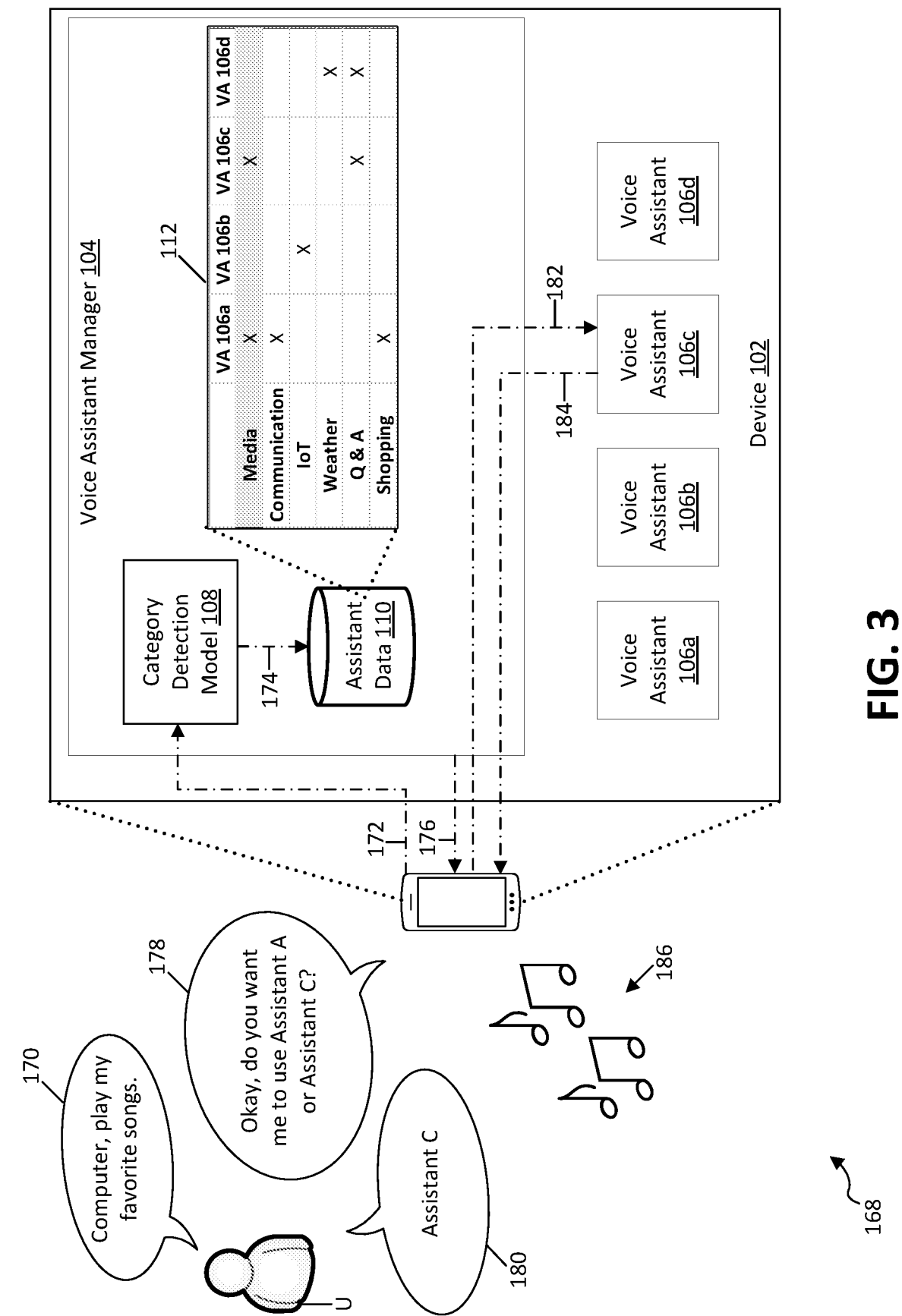
FIG. 3 illustrates an example of processing a voice input.

FIG. 3 illustrates an example 168 of processing a voice input. The example 168 includes a user U and the device 102. The device 102 includes the voice assistant manager 104 and the plurality of voice assistants 106a-d. In the example shown, the voice assistant manager 104 includes the category detection model 108, the assistant data 110, and category-VA data 112. In the example 168, the user U speaks the utterances 170 and 180, and the device 102 outputs the responses 178 and 186. Furthermore, as illustrated by the operations 172-176 and by the operations 182-184, the device 102 uses the voice assistant manager 104 and the voice assistants 106a-d to process the voice inputs and generate responses.

In the example shown, the user U speaks the utterance 170, which states, "Computer, play my favorite songs." The utterance 170 includes a generic wake word: "Computer." In some embodiments, a generic wake word is a wake word that is not associated with any of the voice assistants 106a-d. In some embodiments, the generic wake word is associated with the device 102 generally or with the voice assistant manager 104.

As illustrated by the operation 172, the device 102 or the voice assistant manager 104 may receive the utterance 170. In some embodiments, the voice assistant manager 104 may determine whether the utterance 170 includes a wake word. In some embodiments, in response to detecting a generic wake word (e.g., "Computer"), the voice assistant manager 104 may have the discretion to select which of the voice assistants 106a-d to communicate the utterance 170 to. To do so, the voice assistant manager 104 may use the category detection model 108 to determine a category of the utterance. The category detection model 108 may determine, for example, that the utterance 170 relates to the category "Media."

As illustrated by the operation 174, the voice assistant manager 104 may determine which of the voice assistants 106a-d is associated with the detected category. For example, the voice assistant manager may use the category-VA data 112 to determine that both the voice assistant 106a and the voice assistant 106c are associated with the category "Media." Although not illustrated in the example 168, the voice assistant manager 104 may, in some embodiments, communicate the utterance to each of the voice assistants 106a and 106c.

In the example shown, the voice assistant manager 104 may, as illustrated by the operation 176, generate a response that indicates which of the voice assistants 106a-d are configured to handle a request of the utterance 170. Furthermore, voice assistant manager 104 may ask whether the user would like to communicate a request of the utterance to one of the identified assistants. In the example, shown, the voice assistant manager 104 may cause the device 102 to output the response 178, which states, "Okay, do you want me to use Assistant A or Assistant C."

In response, the user U may speak the utterance 180, which states, "Assistant C." As illustrated by the operation 182, the device 102 may receive the utterance 180. In some embodiments, the voice assistant manager 104 may recognize that utterance 180 relates to selected voice assistant 106c (e.g., by detecting a wake word or other data associated with the voice assistant 106c in the utterance 180). Furthermore, in the example shown, the voice assistant manager 104 may communicate data to the voice assistant 106c. The voice assistant 106c may receive the data, process a request of the data (e.g., "play my favorite songs"), and generate a response. As described below, the voice assistant 106c may be communicatively coupled with a cloud service that may process the request.

As illustrated by the operation 184, the voice assistant 106c may generate a response and output the response to the user U. For example, the response may be a data stream that media content. In the example 168, the media content may be related to music from a "favorite songs" playlist associated with the user U, as illustrated by the response 186. In the example shown, the voice assistant 106c may transmit the response to the voice assistant manager 104, which may cause the device 102 to output the response 186.

As illustrated by the method 168, aspects of the present disclosure may, based on a detected category of an utterance, identify when multiple voice assistants are capable of responding to a request and may allow the user to select which of the voice assistants to interact with, thereby exposing multiple voice assistants to the user while also allowing the user to retain control over voice assistant interactions. Furthermore, as is further described below, aspects of the present disclosure allow, in some embodiments, a user to broadcast a request to multiple voice assistants, thereby reducing the number of requests that a user must make, saving computing resources expended in processing multiple requests, and improving the user experience by ensuring that the user communicates with all the relevant voice assistants, when the user desires. Furthermore, aspects of the present disclosure allow a user to utilize a generic wake word, a feature that may be convenient for a user that does not know how to call a specific assistant, does not know which assistant to call, or is unaware of one or more assistants on the device 102.

Figure 4:
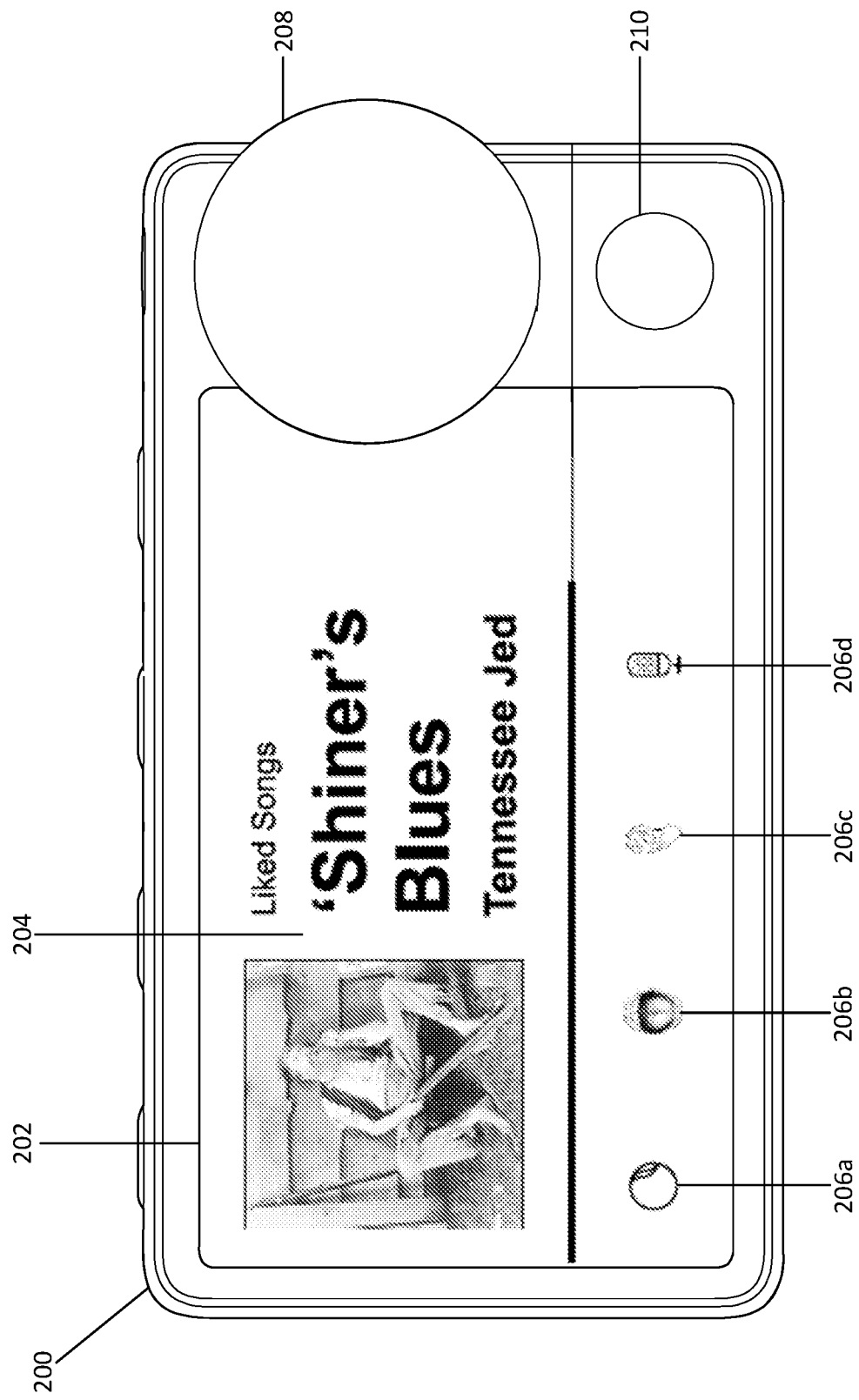
FIG. 4 illustrates an example device in which aspects of the present disclosure may be implemented.

FIG. 4 illustrates an example device 200 with which aspects of the present disclosure may be implemented. In the example shown, the device 200 includes a user interface 202, content 204, a plurality of voice assistant icons 206a-d, a radial dial 208, and a button 210.

The device 200 is an example of the device 102 of FIGS. 1-3. For example, the device 200 may include the voice assistant manager 104 and the plurality of voice assistants 106a-d. In some embodiments, the device 200 may be implemented in a car. Depending on the embodiment, the device 102 may be a different device than the device 200. Furthermore, depending on the embodiment, the device 102 may include different components than those illustrated as part of the device 200. In addition to the components shown, the device 200 may also include a speaker, microphone, and computer components, such as those described in connection with FIG. 18. The device 200 may include a screen for displaying content. In some embodiments, the screen may be a touch screen.

In the example shown, the user interface 202 is displayed on the screen of the device 200. The user interface 202 may include content, such as the content 204, and the user interface 202 may include one or more input fields. For example, the user interface 202 may include an input field for receiving text or an input field that may be selected. In the example of FIG. 4, the content 204 includes data related to media that is being played. For example, the content 204 includes a playlist ("Liked Songs"), a song name ("'Shiner's Blues"), an artist ("Tennessee Jed"), an image, and a status bar. Depending on the content and type of content, the data displayed in the user interface 202 may vary.

The user interface 202 may also include a plurality of voice assistant icons 206a-d. In some embodiments, each of the voice assistant icons 206a-d may be a small image, one or more shapes, or another visual representation. In some embodiments, each of the voice assistant icons 206a-d may correspond to a voice assistant (e.g., a voice assistant of the voice assistants 106a-d) that is available on the device 200. In some embodiments, one or more of the voice assistant icons 206a-d may be text—or include text—such as a wake word or category of an associated voice assistant. In some embodiments, the user interface 202 may display the voice assistant icons 206a-d in response to one or more of a user voice command related to voice assistants or a user input via the radial dial 208, the button 210, or a touch of the display of the device 200.

In some examples, each of the voice assistants 106a-d that are available on a device may correspond to a voice assistant icon that is displayed in the user interface 202. In other examples, only some of the voice assistants 106a-d may have an icon that is displayed in the user interface 202. Furthermore, in some embodiments, an icon of the voice assistant icons 206a-d may be associated with a category or action type associated with one or more of the voice assistants 106a-d. For example, the voice assistant icons 206a-d may include an icon that looks like a storm cloud, and the storm cloud icon may be associated with one or more of the voice assistants 106a-d that provide weather-related functionality. In such an example, the user may select the storm cloud icon to direct an utterance to the one or more voice assistants 106a-d associated with that icon. By displaying voice assistant icons 206a-d in the user interface 202, a user may, in some embodiments, be able to determine what voice assistants are available on the device 200, and the user may know what wake words and requests may be directed at the device 200. However, as described above, even if a voice assistant available on the device 200 is not associated with a displayed voice assistant icon, that voice assistant may still be used to fulfill a user's voice request, because the voice assistant manager 104 may, for example, detect a category of the voice request and select a voice assistant based at least in part on the detected category.

The radial dial 208 may be a physical dial that a user may use to interact with the device 200. In some embodiments, the user may rotate the dial 208 to select an option displayed in the user interface 202 or to alter a setting of the user interface 202 or the device 200 (e.g., a sound setting or a content display size). In some examples, a user may use the radial dial 208 to select a voice assistant of the plurality of voice assistants 106a-d or to interact with the voice assistant manager 104. In some embodiments, a user may touch or press the radial dial 208 to interact with the device 200 or the user interface 202. The button 210 may be a physical button that a user may use to interact with the device 200 or the user interface 202.

Figure 5:
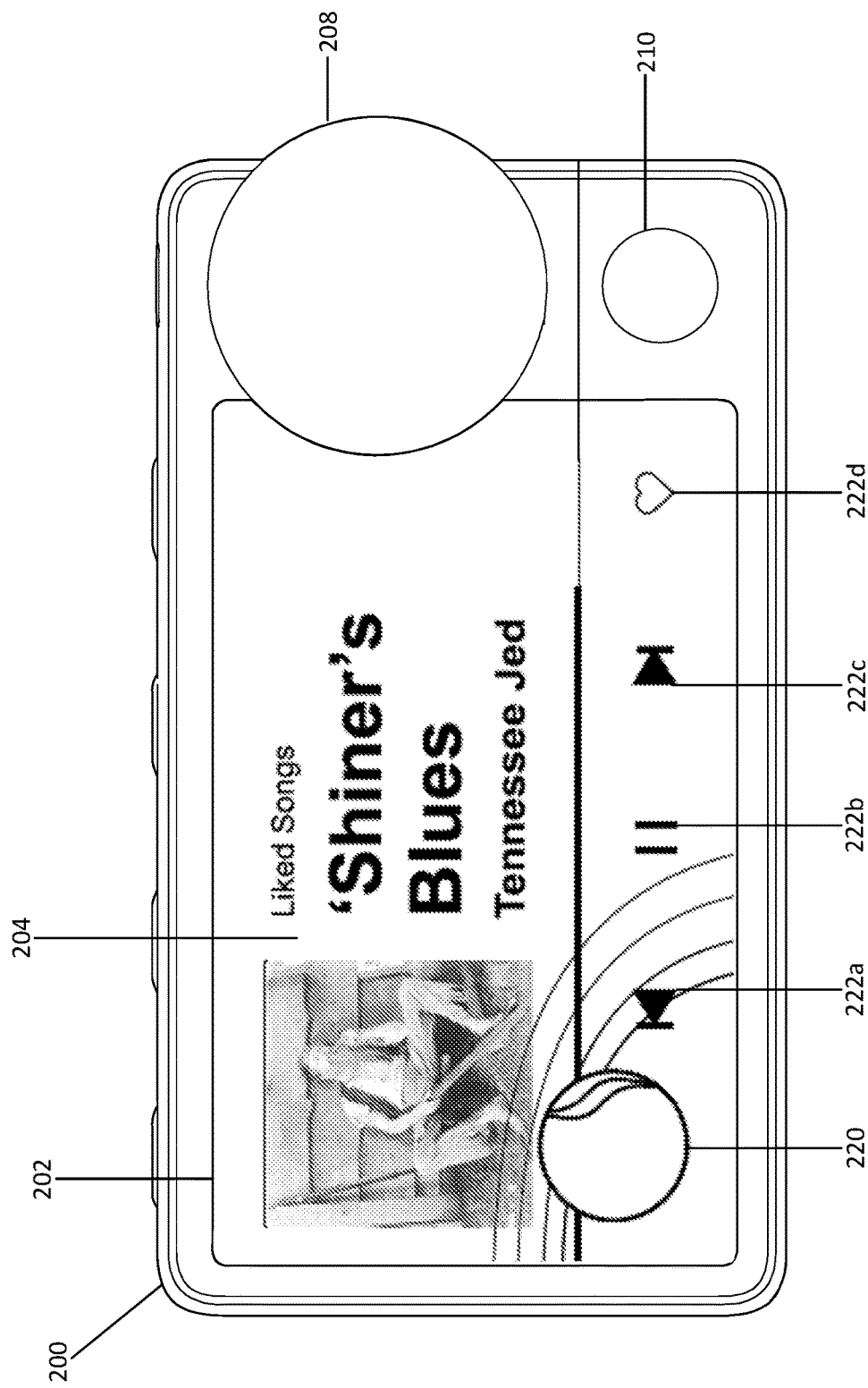
FIG. 5 illustrates an example device in which aspects of the present disclosure may be implemented.
Figure 6:
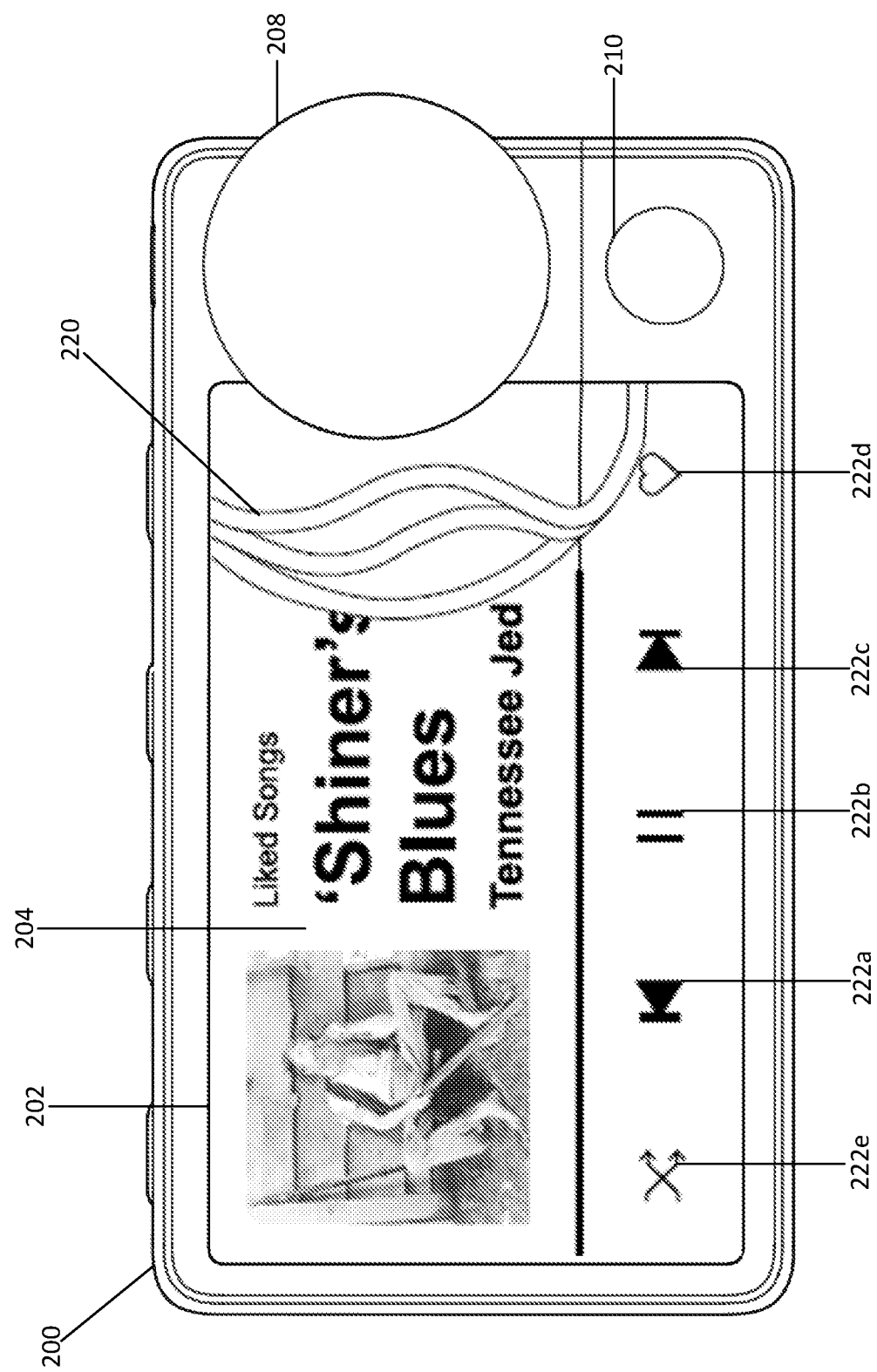
FIG. 6 illustrates an example device in which aspects of the present disclosure may be implemented.

FIGS. 5-6 further illustrate the example device 200 of FIG. 4. In the examples of FIGS. 5-6, the device 200 includes the user interface 202, the radial dial 208, and the button 210. The user interface 202 includes content 204, a selected assistant icon 220, and a plurality of input fields 222a-d. In some embodiments, a user may use the plurality of input fields 222a-d to interact with the device 200, with components of the device 200, with the user interface 202, or with the content 204. Depending on the embodiment and the content displayed, the user interface 202 may include more, less, or different input fields than the input fields 222a-d (e.g., the example of FIG. 6 includes the input field 222e).

In the example shown, the selected assistant icon 220 is an icon that is associated with one of the voice assistants 106a-d. Furthermore, in the example shown, the selected assistant icon 220 is an enlarged or altered version of one of the voice assistant icons 206a-d of FIG. 4. In other embodiments, the selected assistant icon 220 may not be a variation of any of the voice assistant icons 206a-d but nevertheless may be associated with one of the voice assistants 106a-d. In some embodiments, the selected assistant icon 220 may be a color, shape, shading, or other visual representation.

In the example of FIG. 5, the selected assistant icon 220 is in the lower-left corner of the user interface 202; in the example of FIG. 6, the called assistant 220 is on the right side of the user interface 202; in other embodiments, the selected assistant icon 220 may appear in other areas of the user interface 202. In some embodiments, the selected assistant icon 220 may indicate that a user is interacting with the voice assistant associated with the selected assistant icon 220. For example, if the voice assistant manager 104 detects a category of an utterance and communicates the utterance to a voice assistant associated with that category, then an icon associated with that voice assistant may be displayed as the selected assistant icon 220. As another example, if the voice assistant manager 104 detects a wake word in an utterance and identifies a called voice assistant associated with the wake word, then an icon associated with the called assistant may be displayed as the selected assistant icon 220. Furthermore, in some embodiments, the selected assistant icon 220 may indicate that an associated voice assistant is active. Furthermore, the user interface 202 may display other data that indicates an action being performed by a selected or called voice assistant. For example, the selected assistant icon 220 may be displayed with a sound wave to illustrate that the selected voice assistant is outputting a response, or the user interface 202 may include other data illustrating that a voice assistant is processing a request or verifying a wake word.

Figure 7:
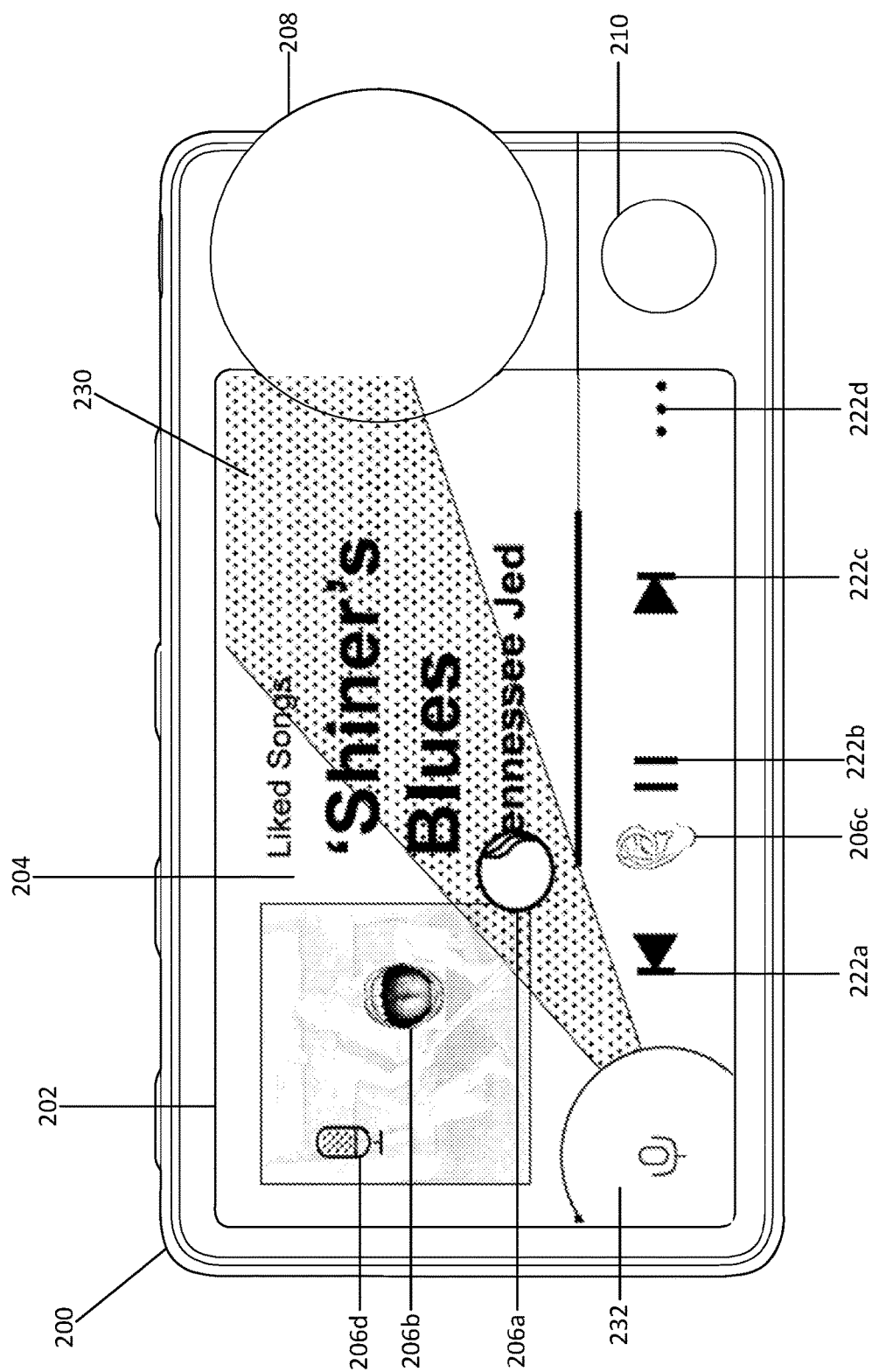
FIG. 7 illustrates an example device in which aspects of the present disclosure may be implemented.
Figure 8:
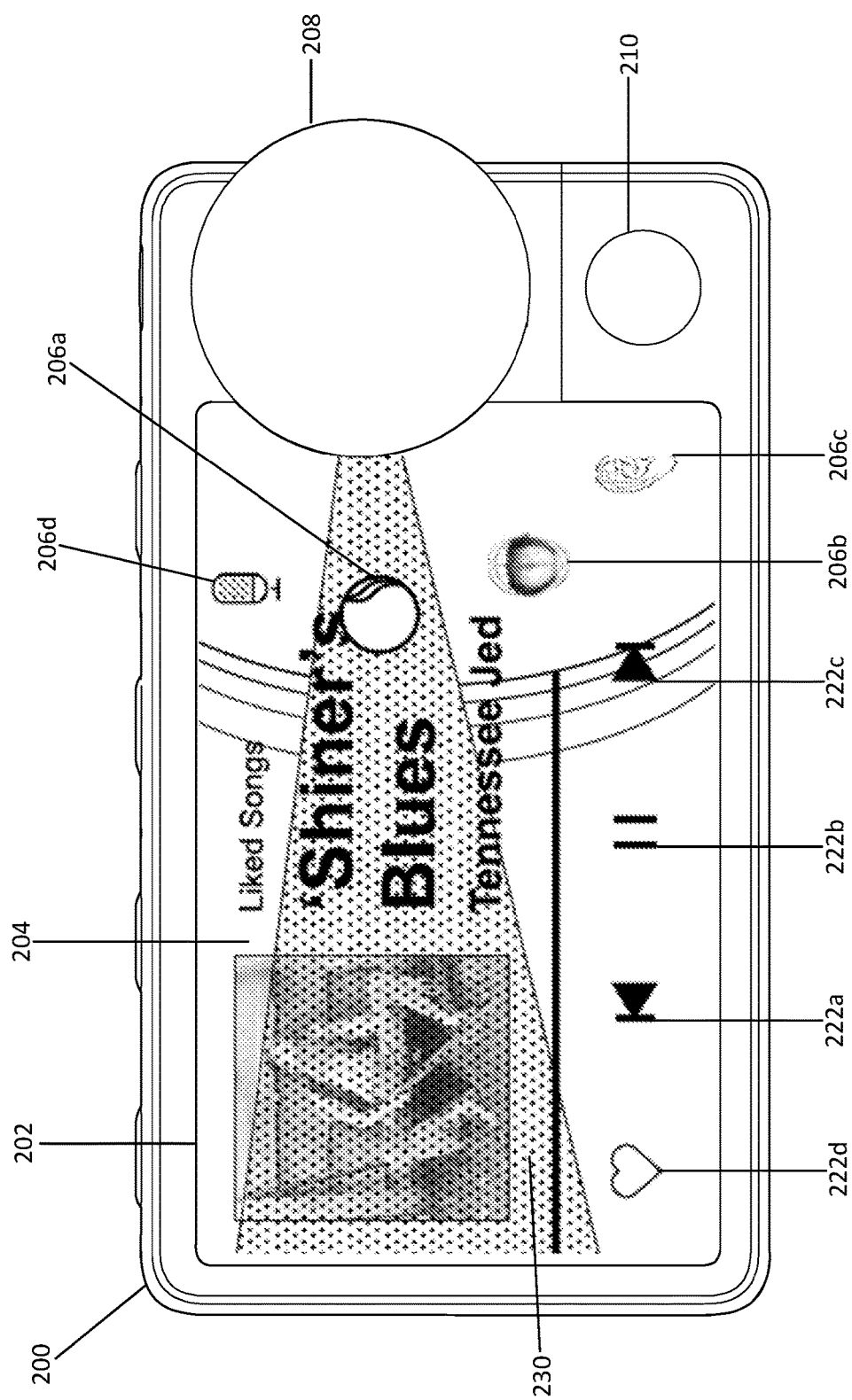
FIG. 8 illustrates an example device in which aspects of the present disclosure may be implemented.

FIGS. 7-8 further illustrate the device 200 of FIGS. 4-6. In the examples of FIGS. 7-8, the device 200 includes the user interface 202, the radial dial 208, and the button 210. The user interface 202 includes content 204, the plurality of voice assistant icons 206a-d, and a plurality of input fields 222a-d. Additionally, in FIGS. 7-8, the user interface 202 includes a selected assistant field 230. In the example of FIG. 7, the voice assistant icons 206a-d are disposed in an arc around a microphone dial 232. In the example of FIG. 8, the voice assistant icons 206a-d are disposed in an arc around the radial dial 208.

In some embodiments, the user interface 202 may display the voice assistant icons 206a-d, as shown in the examples of FIGS. 7-8, in response to a user input. For example, the user may transmit a voice request for the device 200 to display available assistants. Furthermore, in some embodiments, the user may use the radial dial 208 or the button 210 to trigger a display of available assistants. In some embodiments, the voice assistant manager 104 may determine what assistants belong to the voice assistants 106a-d and display one or more icons associated with the voice assistants 106a-d.

In some embodiments, the selected assistant field 230 may indicate (e.g., by shading or by another visual representation) one or more selected voice assistants of the voice assistants 106a-d. For example, in response to selecting a voice assistant associated with a detected category, the voice assistant manager 104, or another component of the device 200, may cause the selected assistant field 230 to include an icon of the voice assistant icons 206a-d associated with the selected voice assistant. As another example, in response to detecting a wake word and identifying a called assistant, the voice assistant manager 104, or another component of the device 200, may cause the selected assistant field 230 to include an icon of the voice assistant icons 206a-d associated with the called voice assistant. Additionally, in some embodiments, a user may touch the user interface 202, press the button 210, or use the radial dial 208 to select a voice assistant. In such examples, the selected assistant field 230 may indicate which voice assistant the user is selecting.

Figure 9:
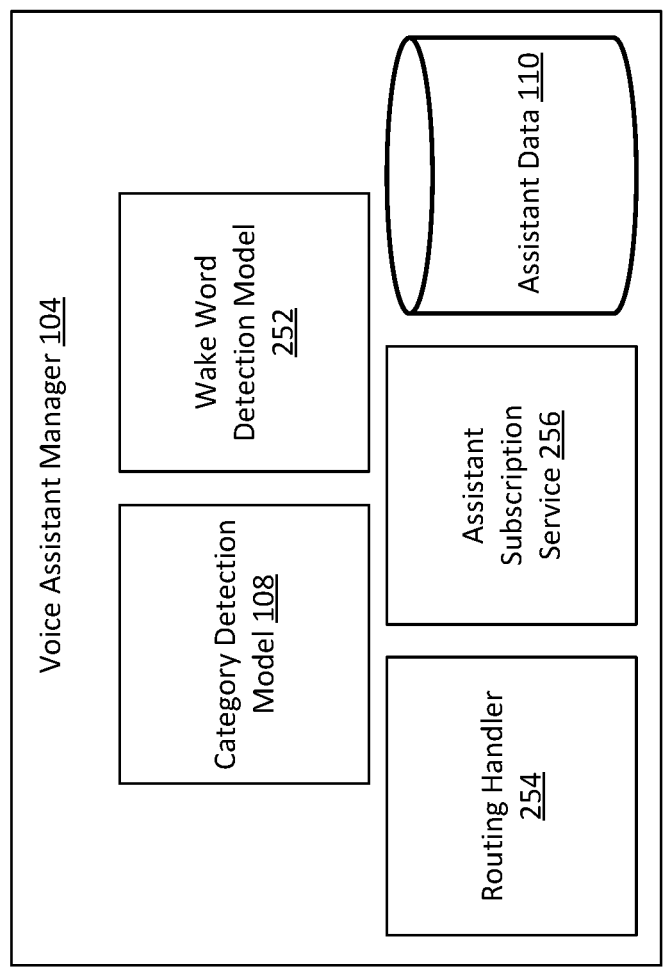
FIG. 9 illustrates a schematic block diagram of example aspects of a voice assistant manager.

FIG. 9 illustrates a schematic block diagram of example aspects of the voice assistant manager 104. In the example shown, the voice assistant manager 104 includes a plurality of components, including the category detection model 108, a wake word detection model 252, a routing handler 254, an assistant subscription service 256, and assistant data 110. Each of the components of the voice assistant manager 104 may be implemented using software, hardware, or a combination of software and hardware. Additionally, in some examples, the voice assistant manager 104 may include more or fewer components than those illustrated in the example of FIG. 9. Furthermore, depending on the embodiment, components of the voice assistant manager 104 may be configured to perform different operations than those described herein. Additionally, depending on the embodiment, an operation may be performed by a different component—or combination of components—than described herein.

The category detection model 108 may be a model for detecting a category in an utterance. For example, when the voice assistant manager 104 receives an utterance, the voice assistant manager 104 may input the utterance into the category detection model 108 to determine a category that the utterance relates to. The category detection model 108 may be a natural language processing model. In some embodiments, the category detection model 108 may perform one or more tasks related to natural language understanding. In some examples, the category detection model 108 may implement machine learning techniques (e.g., the model may be based on a neural network). The category detection model 108 may be trained to recognize a plurality of categories in utterances. For example, the category detection model 108 may detect one or more words in an utterance. In some embodiments, based at least in part on the detected words and their relative positioning, the category detection model 108 may output one or more likelihoods that the utterance is related to one or more of the plurality of categories. In some embodiments, if a likelihood that an utterance relates to a category is greater than a threshold value, then the category detection model 108 may determine that the utterance relates to that category. In some embodiments, the threshold value may be configured by a user of the voice assistant manager 104 or by an administrator of the voice assistant manager 104. In some embodiments, the category detection model 108 may determine a subcategory of an utterance, such as one of the subcategories depicted below in connection with FIG. 10.

The wake word detection model 252 may be a model for detecting a wake word in an utterance. For example, when the voice assistant manager 104 receives an utterance, the voice assistant manager 104 may input the utterance into the wake word detection model 252 to determine whether the utterance includes a wake word. The wake word detection model 252 may be a natural language processing model. In some examples, the wake word detection model 252 may implement machine learning techniques (e.g., the model may be based on a neural network). The wake word detection model 252 may be trained to recognize a plurality of wake words (e.g., the wake words associated with the voice assistants 106a-d). In some embodiments, the wake word detection model 252 may output one or more likelihoods that the utterance includes one or more wake words. If the likelihood that a particular wake word is present is above a threshold value, then the wake word detection model 252 may determine that the wake is present. In some embodiments, the threshold value may be defined by a user or administrator of the voice assistant manager 104.

As is further described below, the voice assistant manager 104 may update the category detection model 108 and the wake word detection model 252. For example, after correctly or incorrectly determining a category of an utterance, the voice assistant manager 104 may update the category detection model. For example, the utterance and the category it is actually associated with may be used as a training data for the category detection model 108. Likewise, after correctly or incorrectly determining whether a wake word is present and identifying the wake word, the voice assistant manager 104 may update the wake word detection model 252. Furthermore, the voice assistant manager 104 may update one or more of the category detection model 108, or the wake word detection model 252, as voice assistant data changes, as voice assistants are removed from the device 102, or as new voice assistants subscribe to the voice assistant manager 104.

The routing handler 254 may handle receiving and sending communications. In some embodiments, the routing handler 254 may send an utterance to a selected voice assistant, receive a response from the voice assistant, and transmit a response to a user. Additionally, in some embodiments, the routing handler 254 may determine when to send a communication. For example, the routing handler 254 may delay or schedule transmission of an utterance to a voice assistant if that voice assistant is already processing a request. Furthermore, as is further described below, the routing handler 254 may, in some embodiments, determine that two or more utterances are related and combine them before sending the first to a voice assistant, or coordinate the sending of both utterances to the voice assistant. In some embodiments, the routing handler 254 may be configured to send and receive communications pursuant to the Matter standard, thereby enabling the voice assistant manager 104 to communicate with Matter-enabled devices and systems.

The assistant subscription service 256 may handle the subscription of a new voice assistant, manage a change to voice assistant data, or unsubscribe a voice assistant that is being removed. In some examples, the voice assistant manager 104 may expose the assistant subscription service 256 using an application programming interface (API) that a voice assistant may call to subscribe to the voice assistant manager 104. As part of subscribing a voice assistant, the assistant subscription service 256 may receive data related to a voice assistant, such as the following: one or more wake words or wake phrases associated with the voice assistant, one or more categories that the voice assistant relates to, or one or more functionalities of the voice assistant. The assistant subscription service 256 may also communicate with other components of the voice assistant manager 104 regarding changes to a voice assistant. For example, the assistant subscription service 256 may cause the category detection model 108 and the wake word detection model 252 to train to recognize one or more categories or wake words associated with a subscribing voice assistant.

The assistant data 110 may be a data store that includes data related to the voice assistants 106a-d. For example, the category-VA data 112 may be stored in the assistant data 110. Furthermore, the assistant data 110 may include other data related to assistants (e.g., historical usage of assistants, user-assistant preferences, or other data that may relate to the voice assistants 106a-d). Aspects of the assistant data 110 is further described below in connection with FIG. 10.

Figure 10:
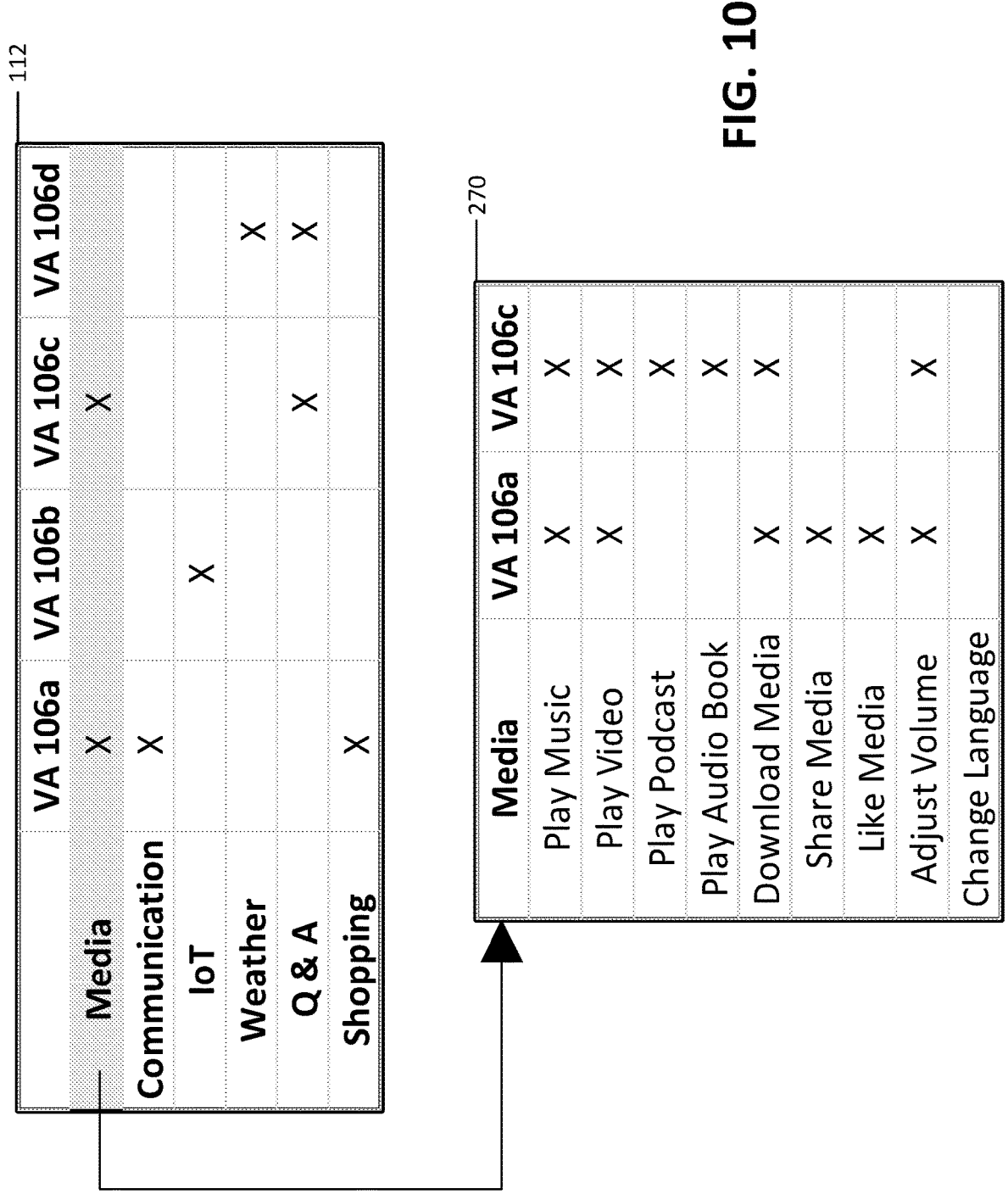
FIG. 10 illustrates example data.

FIG. 10 illustrates example category-VA data 112 and subcategory data 270. As described above, the category-VA data 112 may be included in the voice assistant manager 104 and may be part of the assistant data 110. The category-VA data 112 may include a plurality of categories and a plurality of voice assistants. An "X" in the category-VA data 112 may indicate that the corresponding voice assistant may perform one or more actions related to the corresponding category. For example, the "X" in the top-left corner of the category-VA data 112 may indicate that the voice assistant 106a may perform one or more actions related to "Media." In the example of FIG. 10, the category-VA data includes the following categories: Media (e.g., actions related to media content); Communication (e.g., actions related to sending or receiving messages, calls, or other communications); IoT (e.g., actions related to communicating with or managing Internet of Things devices); Weather (e.g., actions related to the weather); Q&A (e.g., actions related to responding to a question from a user or asking the user a question); Shopping (e.g., actions related to shopping). In other examples, the category-VA data 112 may include more, less, or different categories than in the example of FIG. 10. Furthermore, in some embodiments, one or more of the categories may include subcategories, as illustrated, for example, by the subcategory data 270.

The subcategory data 270 illustrates subcategories for the category "Media." In some embodiments, a subcategory may be one of many actions associated with a category. As shown in the category-VA data 112, the voice assistants 106a and 106c may perform one or more actions related to the category "Media." In the subcategory data 270, subcategories of "Media" are illustrated (e.g., Play Music, Play Video, Play Podcast, etc. . . . ). In the example shown, the voice assistant 106a and the voice assistant 106c are capable of performing an action related to one or more of the subcategories in the subcategory data 270. For example, both the voice assistants 106a and 106c may be able to play music, whereas only the voice assistant 106a may allow a user to share media, and neither the voice assistant 106a nor the voice assistant 106c may be able to change the language of media. Although not illustrated in the example of FIG. 10, the voice assistant manager 104 may also include subcategory data for other categories in addition to or instead of "Media." For example, there may also be subcategory data for the category "Communication," "IoT," other categories in the category-VA data 112, or categories that are not in the category-VA data 112.

In some embodiments, the voice assistant manager 104 may use the subcategory data 270 when determining a category of an utterance. For example, the voice assistant manager 104 may determine that the utterance "play my favorite songs" relates to media (category) and that, more specifically, it relates to playing music (subcategory). In some embodiments, the voice assistant manager 104 may use the category detection model 108 to detect not only the category of an utterance but also the subcategory. In some embodiments, the voice assistant manager 104 may (as is further described below) communicate an utterance to a voice assistant if the voice assistant is associated with a subcategory of the utterance (e.g., if the voice assistant is capable of performing an action related to a subcategory of the utterance). Furthermore, in some embodiments, the voice assistant manager 104 may, in response to determining that a plurality of voice assistants are associated with a category of an utterance, determine which of the plurality of capable voice assistants is associated with a subcategory of the category.

As illustrated by the example of FIG. 10, aspects of the present disclosure may, in some embodiments, use a hierarchical approach (e.g., categories and subcategories, or categories and actions) to more accurately select a voice assistant to send a request to. Such an approach may, in some embodiments, improve the efficiency with which the appropriate voice assistant is selected, particularly as the number of voice assistants increase. Furthermore, in some embodiments, the user may have more flexibility when formulating voice requests. For example, in some embodiments, the user may formulate a voice request primarily around any one of a wake word, category, or subcategory.

Figure 11:
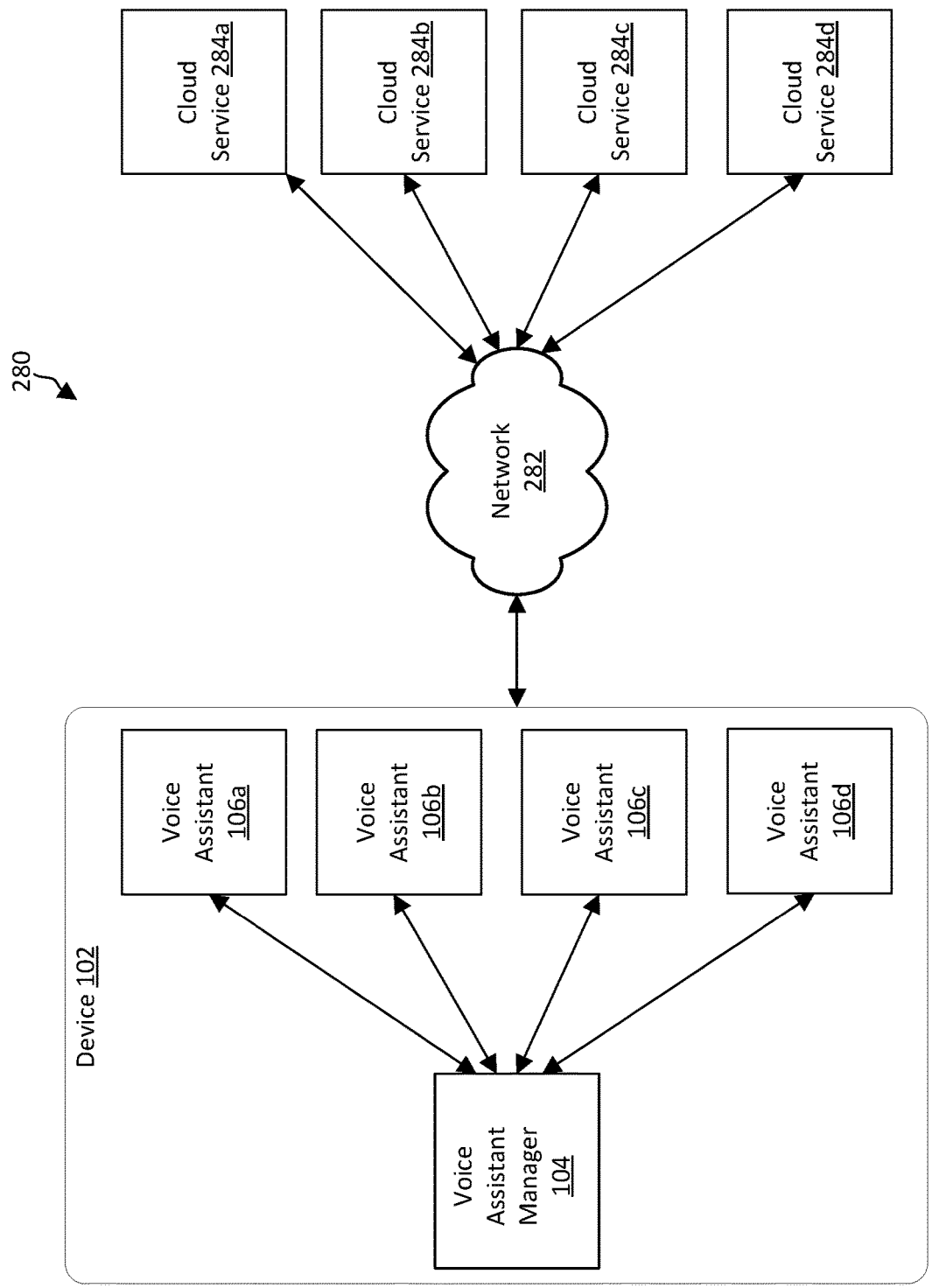
FIG. 11 illustrates an example network environment in which aspects of the present disclosure may be implemented.

FIG. 11 illustrates an example network environment 280 in which aspects of the present disclosure may be implemented. In the example of FIG. 11, the network environment 280 includes the device 102, the network 282, and a plurality of cloud services 284a-d. As described above, the device 102 may include the voice assistant manager 104 and a plurality of voice assistants 106a-d.

In some embodiments, however, the device 102 may not implement one or more of the voice assistants 106a-d. For example, the voice assistant manager 104 may be communicatively coupled to one or more of the voice assistants 106a-d via a local wireless or wired network. In some embodiments, one or more of the voice assistants 106a-d may be compatible with the Matter standard (e.g., a proprietary standard for facilitating communication between devices across different vendors) to enable communication between the device 102 and the voice assistants 106a-d, between the voice assistants 106a-d themselves, or between the voice assistants 106a-d and other devices that may communicate using the Matter standard.

As shown, the network 282 may communicatively couple the device 102 with the plurality of cloud services 284a-d. The network 282 may be, for example, a wireless network, a virtual network, the internet, or another type of network. Additionally, the network 282 may be divided into subnetworks, and the subnetworks may be different types of networks.

The cloud services 284a-d may be services that are associated with the voice assistants 106a-d. Each of the cloud services 284a-d may run on one or more servers that are accessible over a network (e.g., the internet) and may include a combination of software and hardware, or abstracted hardware. Although illustrated as four cloud services in the example of FIG. 11, the device 102 may be coupled with more or fewer cloud services than those shown.

In some embodiments, the voice assistant 106a may be associated with the same company, product, or service as the cloud service 284a; the voice assistant 106b may be associated with the same company, product, or service as the cloud service 284b; the voice assistant 106c may be associated with the same company, product, or service as the cloud service 284c; and so on. In other examples, however, an associated voice assistant and cloud service may not be associated with the same company, product, or service, but the voice assistant may nevertheless call the cloud service to process a request (e.g., if the cloud service is a third party that offers cloud-based services). In some examples, a voice assistant of the voice assistants 106a-d may be associated with more than one of the cloud services 284a-d, or a voice assistant of the voice assistants 106a-d may not be associated with any of the cloud services 284a-d. In some embodiments, by using an associated cloud service, one or more of the voice assistants 106a-d may move computationally expensive tasks (e.g., requiring a large amount of memory or processing power) off the device 102, which may have limited computational resources. As a result, the device 102 may include more voice assistants, and the voice assistants may process requests more quickly.

In some embodiments, one or more of the voice assistants 106a-d may serve as a gateway to an associated cloud service. For example, the voice assistants 106a may be communicatively coupled to the device 102 over a network using a standardized communication protocol, such as the Matter protocol. The device 102 may, in some embodiments, communicate over a network using the Matter protocol with the voice assistant 106a, which may then communicate with an associated cloud service (e.g., the cloud service 284a), thereby exemplifying that the voice assistant 106x may, in some embodiments, operate in a local network as a Matter-enabled gateway to a cloud service. As a result, a device communicatively coupled via a network to the voice assistant 106a using the Matter protocol may also be communicatively coupled to a cloud service, such as the cloud service 284a.

Figure 12:
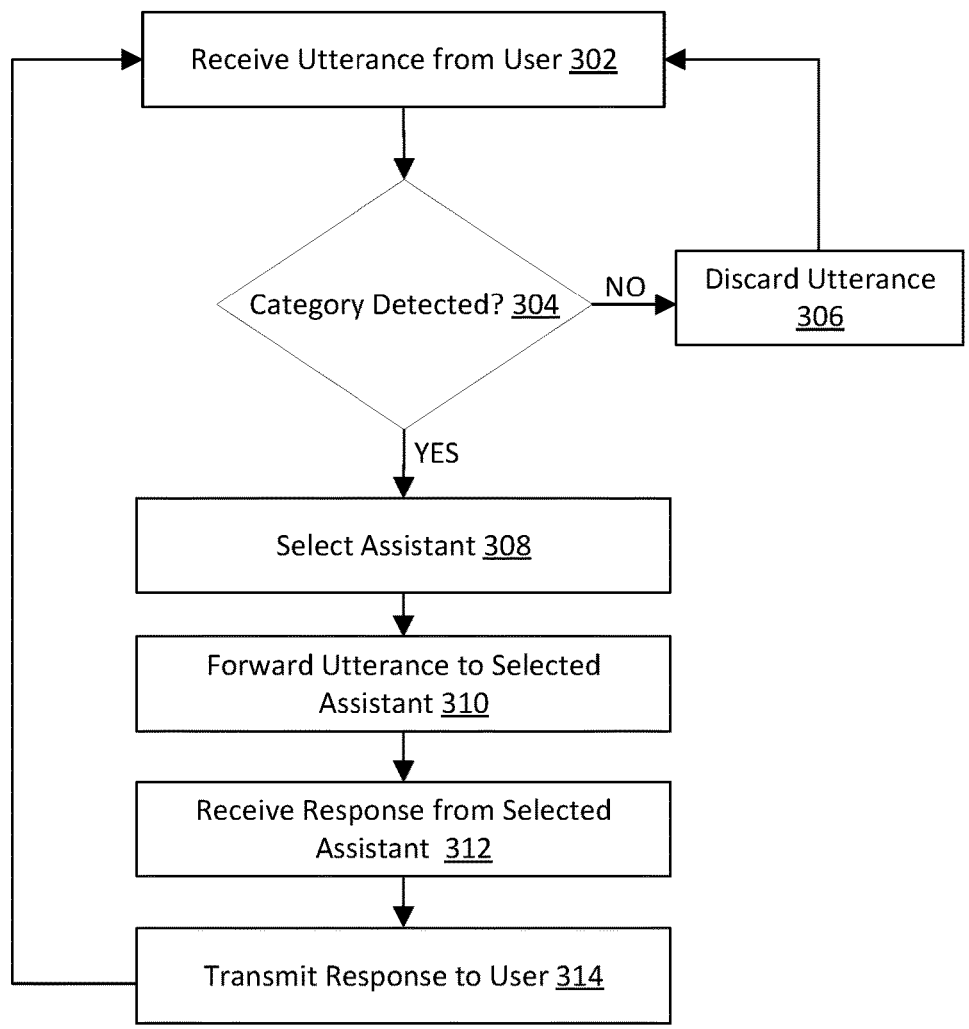
FIG. 12 is a flowchart of an example method for processing a voice input.

FIG. 12 illustrates an example method 300. In some embodiments, the method 300 may be performed by the voice assistant manager 104 in response to an utterance from a user being detected by the device 102. In some embodiments, aspects of the method 300 may be performed by other components of the device 102.

The method 300 may begin at operation 302. At operation 302, the voice assistant manager 104 may receive an utterance from a user. In some embodiments, the voice assistant manager 104 may use components (e.g., a speaker) of the device 102 to actively listen for utterances. Among other things, the voice assistant manager 104 may adjust a sensitivity or other parameter to account for ambient noise or other conditions. In some embodiments, the voice assistant manager 104 may determine that there is an utterance in response to detecting a change in a baseline noise. Furthermore, in some embodiment, the voice assistant manager 104 may receive multiple utterances. For example, the voice assistant manager 104 may receive a first utterance containing a first part (e.g., a wake word) and then a second utterance containing a second part (e.g., a request). In some embodiments, the voice assistant manager 104 may combine multiple utterances into one utterance for downstream processing. As part of receiving an utterance, the voice assistant manager 104 may perform one or more natural language processing or understanding tasks related to receiving and processing voice inputs. For example, the voice assistant manager 104 may parse the utterance (e.g., an audio stream) and convert it into text. As another example, the voice assistant manager 104 may determine when the utterance starts and stops, and separate the sounds of the audio stream into words.

At decision 304, the voice assistant manager 104 may determine whether there is a category associated with the utterance. For example, the voice assistant manager 104 may, as described above in connection with FIGS. 1-3 and 9, input the utterance into the category detection model 108. As described above, the category detection model 108 may detect one or more words in the utterance that are related to a category. Furthermore, the category detection model 108 may use a machine learning model. The category detection model 108 may, in some embodiments, output one or more likelihoods that one or more categories are present in the utterance. For example, the category detection model 108 may output an 80% likelihood that the category of an utterance is "Media," a 5% likelihood that the category is IoT, and a 15% likelihood that the utterance is not related to a category associated with the voice assistant manager 104 or the plurality of voice assistants 106a-d. In response to determining that a likelihood that a category is present is greater than a threshold value (e.g., a value defined by an administrator or user of the voice assistant manager, or a value that is learned by the category detection model 108), then the voice assistant manager 104 may determine that a category is present (e.g., taking the "YES" branch to operation 308). On the other hand, if the category detection model 108 is not sufficiently confident that any one of the plurality of categories is present, then the voice assistant manager 104 may determine that a category is not present (e.g., taking the "NO" branch to operation 306). For example, an utterance may not be directed at the voice assistant manager 104 or any of the voice assistants 106a-d. The utterance may be part of a conversation between a user and another person or system. Or the utterance may come from a speaker. In such instances, the utterance may not be related to any categories associated with any of the voice assistant 106a-d.

At operation 306, the voice assistant manager 104 may discard an utterance. As part of discarding the utterance, the voice assistant manager 104 may erase any data related to having received the utterance. Such data may include any one or more of the following: a compressed or uncompressed digital audio file of the utterance, data related to the user who sent the utterance (e.g., user profile or identity data), data related to the device 102 (e.g., the device type, device operating system, IMEI number, or other device data), time data related to the utterance (e.g., when the utterance was sent, received, or processed), or location information (e.g., of the device 102 or the user). Furthermore, after discarding the utterance, the voice assistant manager 104 may return to listening for another utterance.

At operation 308, the voice assistant manager 104 may select an assistant to handle the utterance. The selected assistant may be one of a plurality of voice assistants that are communicatively coupled with the voice assistant manager 104, such as the plurality of voice assistants 106a-d. In some embodiments, the voice assistant manager 104 may select the selected assistant based at least in part on the detected category of the utterance. Selecting the voice assistant from the plurality of voice assistants is further described below in connection with FIG. 13. Furthermore, voice assistant manager 104 may also, in some embodiments, select two or more voice assistants from the plurality of voice assistants, as is further described below.

At operation 310, the voice assistant manager 104 may communicate the utterance to the selected assistant. In some embodiments, the voice assistant manager 104 may communicate the utterance to a plurality of assistants, as is further described below. In some embodiments, the voice assistant manager 104 may first request permission from the user before communicating the utterance to the selected assistant. In some embodiments, the voice assistant manager 104 may transmit a data representation of the utterance to the selected assistant. In some embodiments, the voice assistant manager 104 may send an audio stream or audio file of the utterance to the selected assistant. In some embodiments, the voice assistant manager 104 may also send other data to the selected assistant, such as the detected category of the utterance, information related to the user who sent the utterance, or other information related to the utterance or the context in which the utterance was received. Furthermore, in some embodiments, the voice assistant manager 104 may send multiple utterances to the selected assistant. For example, the voice assistant manager 104 may determine that a user intended for two or more utterances to be together (e.g., the user may have paused between sending the utterances). In such a situation, the voice assistant manager 104 may combine the utterances and send the combined utterance to the selected assistant or send them all to the selected assistant.

At operation 312, the voice assistant manager 104 may receive a response from the selected assistant. In some embodiments, the selected assistant may perform one or more operations in response to receiving the utterance. For example, the selected voice assistant may determine a request of the utterance (e.g., "check my account balance," "call Tim," "schedule an appointment," etc.), and then the selected assistant may try to fulfill that request. In some embodiments, the selected assistant may transmit the request or the utterance to an associated cloud service, which may process and fulfill the request. In some embodiments, as part of fulfilling the request, the selected assistant (or a cloud service associated with the selected assistant) may generate a response (e.g., content requested by a user, a confirmation that a request was completed, a follow up question to get more information to fulfill the request, etc.). In some instances, the response may include an error indicating that the selected assistant was unable to fulfill the request. The selected assistant may, in some embodiments, send a response directly to the user. In some embodiments, another component of the device 102 may receive the response from the selected assistant. For example, a component of the device 102 that interfaces with the user 102 (e.g., a component involved in outputting information to the user, such as an input/output device) may receive the response, and then transmit the response to the user.

In some embodiments, the voice assistant manager 104 (or another component of the device 102) may receive responses from a plurality of voice assistants. For example, in some instances, a plurality of voice assistants may be associated with a category, and the voice assistant manager 104 may send the utterance to a plurality of voice assistants. In such a situation, the voice assistant manager 104 may receive a plurality of responses (e.g., from two or more of the assistants that the voice assistant manager 104 sent the utterance to). In some embodiments, the voice assistant manager 104 may then ask the user (e.g., by causing the device 102 to output a question) which of the plurality of responses the user wants to receive. Thereafter, in response to receiving a user selection input that indicates which voice assistant or which response the user wants, the voice assistant manager 104 may select that response.

At operation 314, the voice assistant manager 104 (or another component of the device 102) may transmit a response received from the selected assistant to the user. Example responses include, but are not limited to, the following: one or more results for a query; a confirmation that a task was completed; data that can be output by the device 102 in a text-to-speech (TTS) process; or other information related to fulfilling or responding an utterance. In some embodiments, the voice assistant manager 104 may also alter the response or a format of the response (e.g., converting a response to speech) before sending it to the user. Furthermore, in some embodiments, the voice assistant manager 104 may add to the response before sending it (e.g., the voice assistant manager 104 may add to the response to ask whether the user would like to send another request, or whether the user would like to send a request to a different voice assistant). Once the voice assistant manager 104 has transmitted the response to the user, the voice assistant manager 104 may listen for another utterance, either from the user or from a different user.

Figure 13:
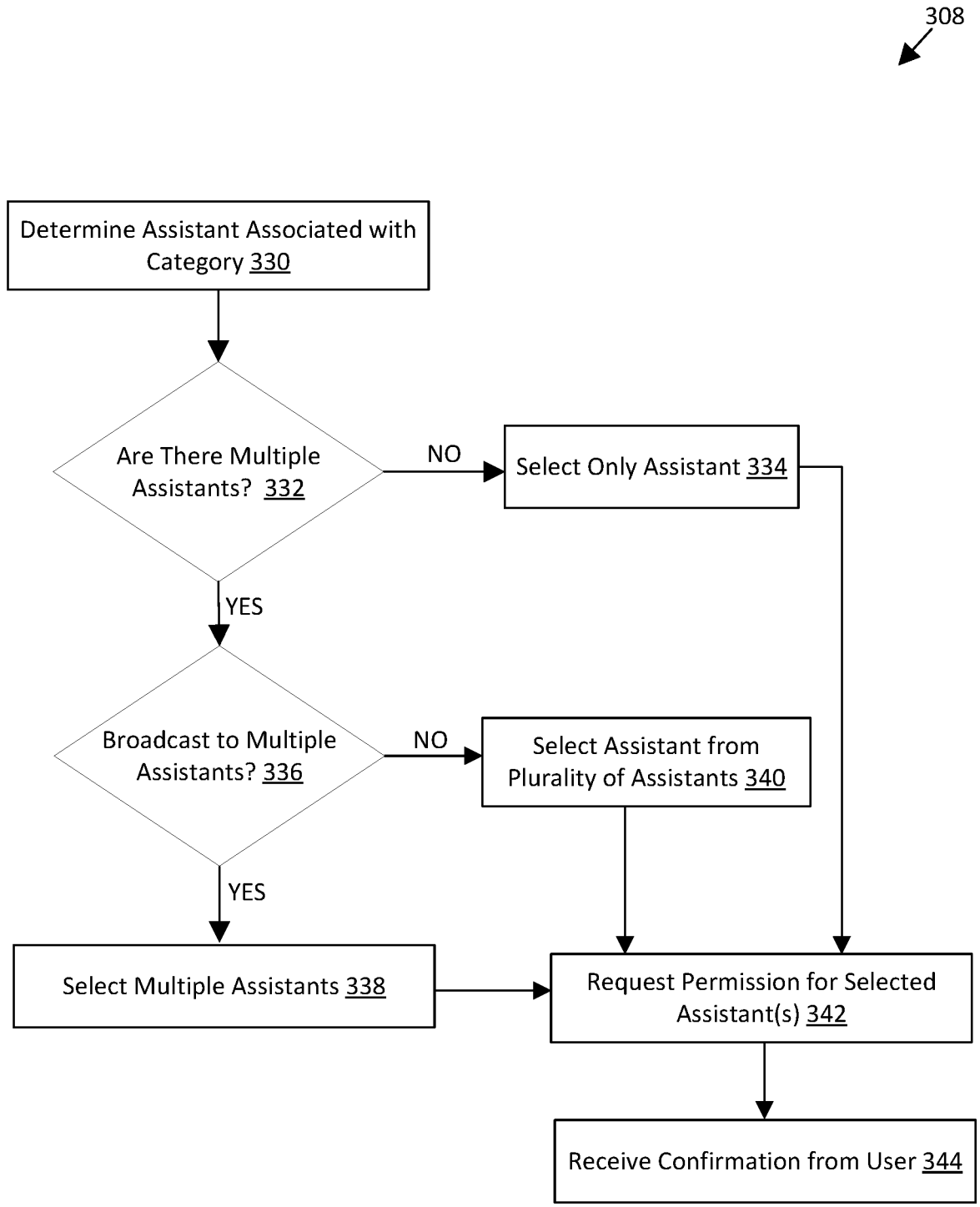
FIG. 13 is a flowchart of an example method for selecting a voice assistant.

FIG. 13 is a flowchart of an example method 308 having operations 330-344, at least some of which may be used for performing at least part of selecting an assistant, an operation that is described above as operation 308 in FIG. 12. In some embodiments, the method depicted in FIG. 13 may be performed by the voice assistant manager 104.

At operation 330, the voice assistant manager 104 may determine an assistant associated with a category detected in the utterance. For example, the voice assistant manager 104 may use the category-VA data 112 to determine one or more assistants, from a plurality of voice assistants, that are associated with a detected category. Furthermore, in some embodiments, the voice assistant manager 104 may determine which of a plurality of assistants are associated not only with a category of an utterance, but also with a subcategory of the utterance, as described above in connection with FIG. 10. In some embodiments, the voice assistant manager 104 may not use the category-VA data 112 to determine what assistants are associated with a category. For example, the voice assistant manager 104 may query a voice assistant to determine whether the voice assistant is associated with the category, or whether the voice assistant is configured to handle an action associated with the category. In other examples, the voice assistant manager 104 may use data besides the category-VA data 112 to determine whether a voice assistant is associated with a category, or the voice assistant manager 104 may use other techniques to determine which voice assistant (or voice assistants) is associated with a category.

At decision 332, the voice assistant manager 104 may determine whether there are multiple assistants associated with the detected category. For example, the voice assistant manager 104 may determine that there is more than one voice assistant that is capable of performing an action related to the detected category, such as in the example 168 of FIG. 3. In response to determining that there is only one assistant associated with the detected category, the voice assistant manager may proceed to the operation 334 (e.g., taking the "NO" branch). At operation 334, the voice assistant manager 104 may select the one voice assistant associated with the category, and then the voice assistant manager 104 may proceed to operation 342, which is further described below. In some embodiments, the voice assistant manager 104 may select the voice assistant associated with the category, and then the voice assistant manager 104 may proceed to the operation 344 (e.g., if the voice assistant manager 104 is configured to skip the operation of asking permission if there is only one voice assistant associated with the detected category). In response to determining that there is a plurality of voice assistants associated with the category, the voice assistant manager 104 may proceed to the decision 336 (e.g., taking the "YES" branch).

At decision 336, the voice assistant manager 104 may determine whether to broadcast to all assistants that are associated with the category. For instance, in some embodiments, the voice assistant manager 104 may broadcast an utterance to all the voice assistants that are associated with a category. For example, a user may say "close all blinds" to the device 102. The voice assistant manager 104 may determine that there are two voice assistants associated with the category of the utterance (e.g., associated with the category "blinds," "IoT," or "home"). One of the assistants may be configured to close certain blinds, while the other assistant may be configured to close other blinds. In such a situation, the voice assistant manager 104 may broadcast the utterance to both of the voice assistants. As another example, the voice assistant manager 104 may broadcast a question to multiple voice assistants that are configured to perform question-and-answer tasks, and the voice assistant manager 104 may provide the user with answers from the multiple voice assistants.

In some embodiments, the voice assistant manager 104 may detect, based on the utterance, whether to broadcast the utterance to multiple assistants (e.g., the user may state a configurable keyword, such as "all," "each," or "broadcast"). In some embodiments, the voice assistant manager 104 may be configured (e.g., by a user or administrator) to broadcast to multiple assistants for certain requests, categories, or subcategories. By broadcasting the utterance to multiple voice assistants, the voice assistant manager 104 can, in some embodiments, reduce the number of requests that the user must send and, in some embodiments, better fulfill user's request. In response to determining to broadcast to all assistants associated with the detected category, the voice assistant manager 104 may proceed to operation 338 (e.g., taking the "YES" branch). At operation 338, the voice assistant manager 104 may select the multiple assistants, and then the voice assistant manager 104 may proceed to operation 342, which is further described below. In response to determining not to broadcast to multiple assistants, the voice assistant manager 104 may proceed to operation 340 (e.g., taking the "NO" branch).

At operation 340, the voice assistant manager 104 may select an assistant from a plurality of voice assistants that are associated with a category. For example, the voice assistant manager 104, having identified multiple voice assistants associated with the utterance's category, and having determined not to broadcast the utterance to multiple assistants, may have to select one of the voice assistants from the plurality of voice assistants associated with the category.

To do so, the voice assistant manager 104 may use one or more of a plurality of techniques. In some embodiments, the voice assistant manager 104 may determine a subcategory of the utterance and determine which assistants are associated with that subcategory. As another example, the voice assistant manager 104 may ask the user which of the identified voice assistants to communicate the utterance to (e.g., as illustrated in the example 168 of FIG. 3). As another example, the voice assistant manager 104 may select the most popular voice assistant (e.g., the voice assistant that has historically been used most of the voice assistants associated with the identified category). As another example, the voice assistant manager 104 may select an assistant based on user preferences (e.g., user-defined preferences regarding sending utterances to certain assistants over others, or inferred user preferences based on how frequently a user interacts with various assistants). As another example, the voice assist manager 104 may select the assistant that was most recently used. As another example, the voice assistant manager 104 may select the assistant based on the time of day that the utterance was detected, or based on a historical popularity of assistants at the time of day (e.g., selecting one assistant at 7 a.m. on a Monday and a different assistant at 7 p.m. on a Friday). As another example, an administrator of the voice assistant manager 104 may define one or more rules for selecting an assistant when multiple assistants may be capable of handling the utterance. As another example, the voice assistant manager 104 may use a model that accounts for characteristics of the utterance, the user, and the context to select one of the assistants. To perform the selection, the voice assistant manager 104 may use one or more of assistant data 110, data or systems external to the voice assistant manager 104, or user inputs.

At operation 342, the voice assistant manager 104 may request permission to send the utterance to the one or more selected assistants. For example, in some embodiments, the voice assistant manager 104 may generate a question or statement that is converted to speech and output by the device 102. For example, the user may send the following utterance to the device 102 or voice assistant manager 104: "What's the weather in Chicago today?" The voice assistant manager 104 may select a voice assistant associated with the category weather (e.g., the voice assistant 106*d*), and the voice assistant manager 104 may send the following to the user: "Do you want me to ask Voice Assistant D?" In other examples, the voice assistant manager 104 may ask the user permission to send the utterance to multiple voice assistants. In other examples, the voice assistant manager 104 may forego asking for the user's permission prior to sending the utterance to the selected voice assistant. In some embodiments, the user may configure a setting of the voice assistant manager 104 that governs whether the voice assistant manager 104 requests permission before sending an utterance to a selected assistant. In some embodiments, by asking the user's permission before sending the utterance to the selected voice assistant, aspects of the present disclosure may prevent an utterance going to a voice assistant that the user does not want to send the utterance to, thereby improving the user's control over their data and respecting user privacy.

At operation 344, the voice assistant manager 104 may receive confirmation from a user to send the utterance to the selected voice assistant. For example, the user may send confirmation via a voice input (e.g., stating "yes" or "sure"), or the user confirmation may come in the form of a physical input (e.g., the user may press a button rotate a dial, or touch a screen of the device 102). In some embodiments, if the user does not give consent, then the voice assistant manager 104 may ask the user whether the user wants to send the request to a different voice assistant. In some embodiments, the voice assistant manager 104 may suggest a different voice assistant if the user does not consent. In some embodiments, if the user does consent to sending the utterance to the selected voice assistant, then the voice assistant manager 104 may send the utterance to the selected voice assistant. In some embodiments, the voice assistant manager 104 may exit the method 308 after the operation 344, thereby returning, in some embodiments, to the method 300 of FIG. 12.

Figure 14:
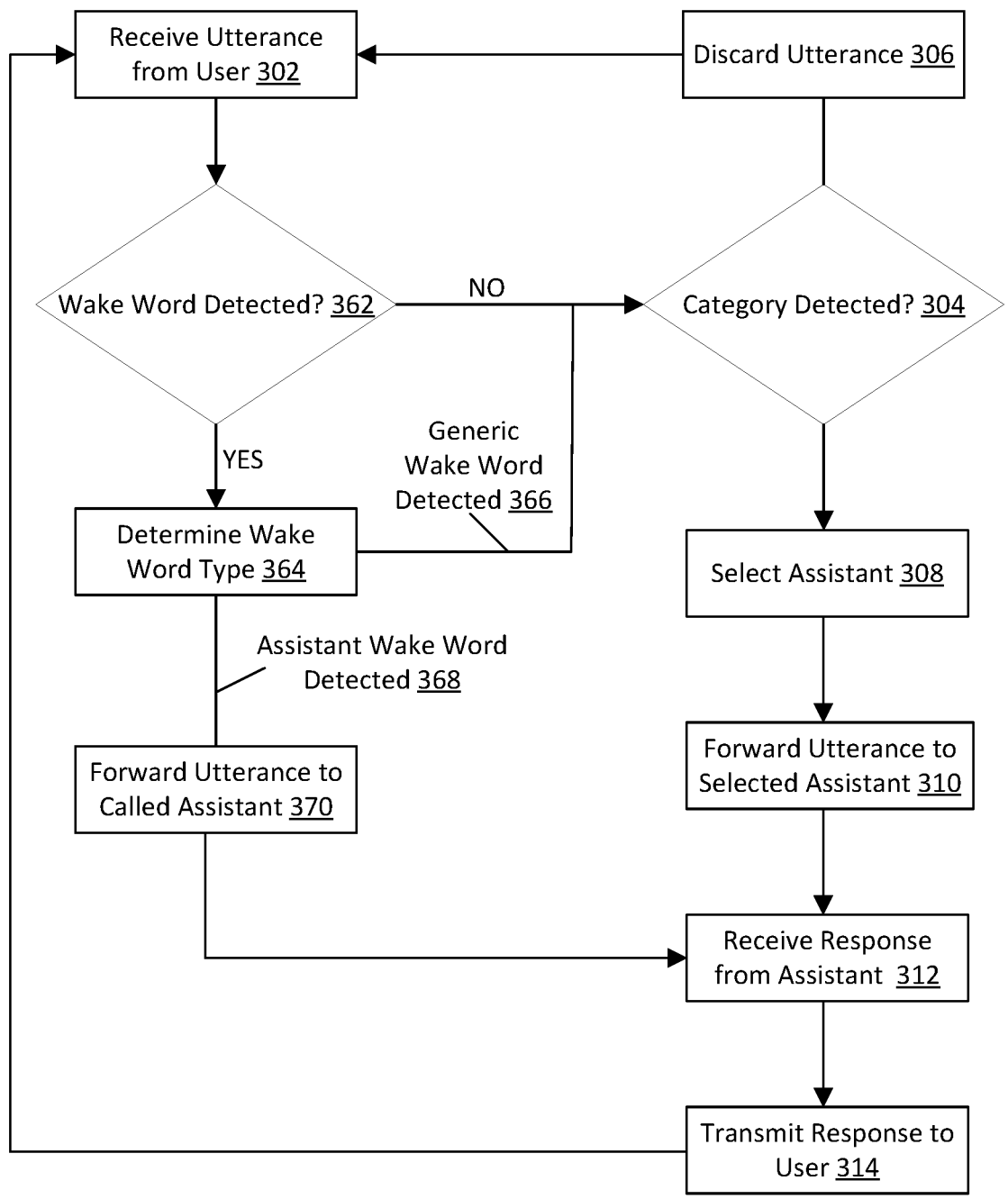
FIG. 14 is a flowchart of an example method for processing a voice input.

FIG. 14 is flowchart of an example method 360. In some embodiments, the method 360 may be performed by the voice assistant manager 104 in response to an utterance from a user being detected by the device 102. As shown, the method 360 includes aspects of the method 300 of FIG. 12.

In some examples, the method 360 may begin at the operation 302. At the operation 302, the voice assistant manager 104 may receive an utterance from a user, as described above in connection with FIG. 12.

At decision 362, the voice assistant manager 104 may determine whether there is a wake word in the utterance. A wake word may be a word or phrase that is used to call a voice assistant (e.g., "Siri," "Alexa," or "Hey Google"). In some instances, a user may want to direct a request to a particular voice assistant and, to do so, the user may include the wake word of that voice assistant in the utterance. Additionally, a wake word may be generic and be used to call a service or device that interacts with voice assistants, such as the device 102 or the voice assistant manager 104. For example, a generic wake word may be "Computer," "Hey Computer," "Device," or another word that is not associated with a specific voice assistant. In some embodiments, the voice assistant manager 104 may detect whether there is a wake word in the utterance by inputting the utterance into a model trained to detect wake words. For example, the wake word detection model 252 of FIG. 9 may, in some embodiments, be used to determine whether there is a wake word present in the utterance and to determine what the wake word is. In response to determining that there is not a wake word in the utterance, the voice assistant manager 104 may proceed to the decision 304 (e.g., taking the "NO" branch). In response to determining that the utterance includes a wake word, the voice assistant manager 104 may proceed to the operation 364 (e.g., taking the "YES" branch).

At the operation 364, the voice assistant manager 104 may determine what type of wake word is in the utterance. For example, the voice assistant manager 104 may determine whether the wake word is a generic wake word or an assistant-specific wake word. To make this determination, the voice assistant manager 104 may use a model to determine what the one or more words of the wake word are, and then use mapping data or a table to determine whether the one or more detected words are associated with a specific voice assistant or with a generic call to another device or service. In some embodiments, one or more voice assistants of a plurality of voice assistants (e.g., the voice assistants 106a-d) may be associated with one or more wake words, and the voice assistant manager 104 may track changes to wake words as assistant data is altered, or as assistants are added or removed. Furthermore, in some embodiments, a user or administrator of the voice assistant manager 104 may configure one or more wake words as generic wake words.

In response to determining that the wake word is associated with a generic wake word (e.g., at operation 366), the voice assistant manager 104 may proceed to the decision 304. In response to determining that the wake word is associated with a specific assistant (e.g., at operation 368), the voice assistant manager 104 may proceed to the operation 370.

At operation 370, the voice assistant manager 104 may communicate the utterance to a called assistant. The voice assistant manager 104 may identify the called assistant based on the detected assistant-specific wake word. To do so, the voice assistant manager 104 may, in some embodiments, use mapping data that links wake words to voice assistants. In some embodiments, the mapping data may be included in the assistant data 110. The called assistant may receive the utterance, process the utterance, and generate a response. Furthermore, in some embodiments, the voice assistant manager 104 may send other data to the called assistant. For example, the voice assistant manager 104 may send data related to the user that sent the utterance or data related to the context (e.g., date, time of day, or a conversational state) to the called assistant. After communicating the utterance to the called assistant, the voice assistant manager 104 may proceed to the operation 312.

At decision 304 (e.g., after failing to detect a wake word, or after detecting a generic wake word), the voice assistant manager 104 may determine whether there is a category associated with the utterance, as described above in connection with FIG. 12. At operation 306, the voice assistant manager 104 may discard the utterance, as described above in connection with FIG. 12. At operation 308, the voice assistant manager 104 may select an assistant associated with the category determined at the decision 304, as described above in connection with FIGS. 12-13. At operation 310, the voice assistant manager 104 may communicate the utterance to the selected assistant, as described above in connection with FIG. 12. Furthermore, as described above in connection with FIGS. 12-13, the voice assistant manager 104 may, in some embodiments, communicate the utterance to more than one assistant associated with the category of the utterance.

At operation 312, the voice assistant manager 104 may receive a response from the assistant that the utterance was communicated to. In some instances, the assistant will be the assistant called by the wake word detected in the utterance. In other instances, the assistant will be an assistant associated with a category of the utterance. The operation 312 is further described above in connection with FIG. 12. At operation 314, the voice assistant manager 104 may transmit a response received from an assistant to a user, as described above in connection with FIG. 12.

Figure 15:
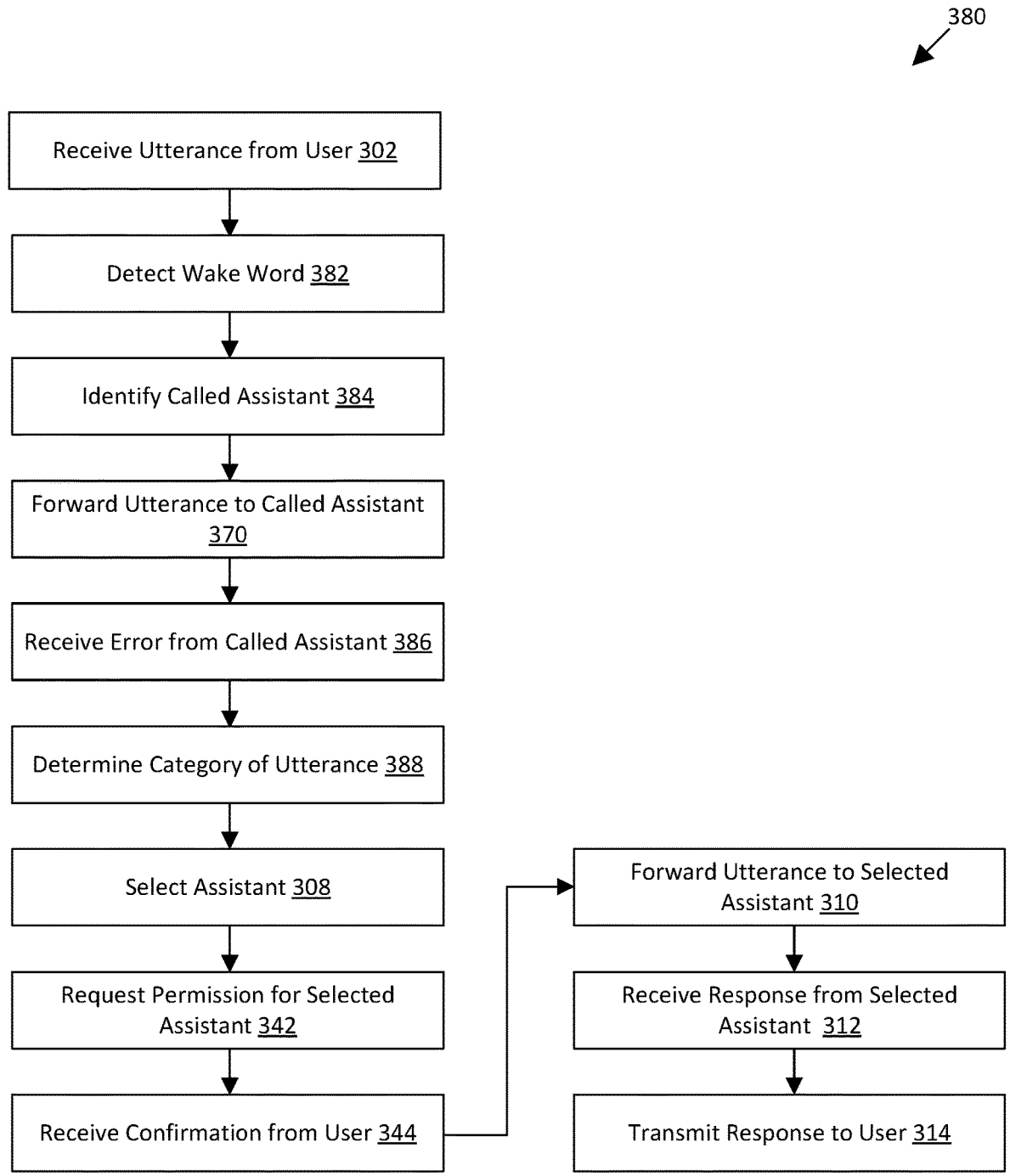
FIG. 15 is a flowchart of an example method for processing a voice input.

FIG. 15 is a flowchart of an example method 380. An example application of aspects of the method 380 are illustrated above in connection with the example 138 of FIG. 2. In some embodiments, the method 380 may be performed by the voice assistant manager 104. The example method 380 includes aspects of the method 300 of FIG. 12, the operation 308 of FIGS. 12-13, and the method 360 of the FIG. 14.

The method 380 may begin at the operation 302. At the operation 302, the voice assistant manager 104 may receive an utterance from a user, as is further described above in connection with FIG. 12.

At operation 382, the voice assistant manager 104 may detect a wake word in the utterance. For example, the voice assistant manager 104 may detect a wake word for a specific voice assistant, such as one of the voice assistants 106a-d. Detecting a wake word is further described above in connection with FIGS. 9 and 14.

At operation 384, the voice assistant manager 104 may identify a called assistant. For example, the voice assistant manager 104 may identify a voice assistant, from a plurality of voice assistants, that is associated with the detected wake word. In some embodiments, the voice assistant manager 104 may, in response to detecting an assistant-specific wake word, elect not to check for a category of the utterance. For example, if a user calls a specific voice assistant using its wake word, then the voice assistant manager 104 may, in some embodiments, honor the user's request and send the utterance to the called assistant without checking whether the called assistant is associated with a category of the utterance. As a result, the called voice assistant may receive, in some instances, an utterance that it cannot handle, as is further described below. Aspects of identifying the called assistant are further described above in connection with FIG. 14.

At operation 370, the voice assistant manager 104 may communicate the utterance to the called assistant, as is further described above in connection with FIG. 14.

At operation 386, the voice assistant manager 104 may receive an error from the called assistant. In some embodiments, the called assistant may try to process the utterance in response to receiving it from the voice assistant manager 104. However, in some embodiments, the called assistant may not be capable of processing the utterance or a request in the utterance. For example, the user may make a request regarding communication with a home device to a voice assistant that only performs actions related to media content. In such an example, the called assistant may generate an error. The error may, among other things, indicate that the voice assistant does not recognize a request in the utterance, or that the voice assistant is unable to fulfill the request. In some embodiments, the voice assistant may then send the error to the voice assistant manager.

At operation 388, the voice assistant manager 104 may determine a category of the utterance. Aspects of determining a category of the utterances are further described above in connection with the decision 304 of FIGS. 12 and 14.

At operation 308, the voice assistant manager 104 may select an assistant associated with the category, as described above in connection with FIGS. 12-13. As described above, the voice assistant manager 104 may also, in some instances, select more than one assistant associated with the category.

At operation 342, the voice assistant manager 104 may request permission to send the utterance to the one or more assistants selected at the operation 308, as is further described above in connection with FIG. 13.

At operation 344, the voice assistant manager 104 may receive a confirmation from the user to interact with the one or more selected assistants, as is further described above in connection with FIG. 13.

At operation 310, the voice assistant manager 104 may communicate the utterance to the selected assistant. At operation 312, the voice assistant manager 104 may receive a response from the one or more selected assistants. At operation 314, the voice assistant manager 104 may transmit one or more responses to the user. Each of the operations 310-314 are further described above in connection with FIG. 12.

As illustrated by the example method 380, the voice assistant manager 104 may, in some embodiments, receive an utterance having a wake word for a called assistant, detect that wake word, and honor the user's request by communicating the utterance to the called assistant. However, if the user called an assistant that is unable to fulfill the request, then the voice assistant manager 104 may detect an error and select an assistant that can handle the request. The voice assistant manager 104 may then suggest the selected assistant to the user and route the utterance to the selected assistant. Thus, the user need not resend the request, and the user need not spend time investigating which assistant may handle the request. As a result, in some embodiments, the user experience is improved, less new requests must be processed (thereby saving computing resources), and an appropriate assistant may be used, even if the user was not aware of the assistant beforehand and even if the user was mistaken as to the functionality of assistants.

Figure 16:
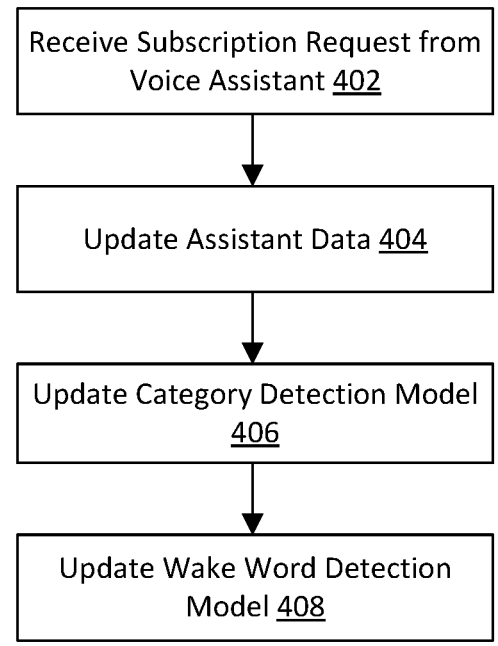
FIG. 16 is a flowchart of an example method for subscribing a voice assistant.

FIG. 16 is a flowchart of an example method 400 for subscribing a voice assistant. In some examples, the method 400 may be performed by the voice assistant manager 104. As described above, the composition of the voice assistants 106a-d may be altered as assistants are removed, or as assistants are added. In some embodiments, a voice assistant may be added by subscribing with the voice assistant manager 104. Furthermore, in some embodiments, a voice assistant may be installed on the device 102 prior to subscribing with the voice assistant manager 104. In some examples, a voice assistant may be downloaded (e.g., from an App Store) and once downloaded (or as part of the downloading and installation process), the voice assistant may subscribe with the voice assistant manager 104. In some embodiments, the voice assistant manager 104 may expose an API that a voice assistant may call to subscribe with the voice assistant manager 104. In some embodiments, the method 400 may begin when a voice assistant subscribes with the voice assistant manager 104.

At operation 402, the voice assistant manager 104 may receive a subscription request from a subscribing voice assistant. The subscription request may include information about the subscribing voice assistant. For example, the subscription request may include one or more categories or subcategories that the subscribing voice assistant is associated with. As another example, the subscription request may include one or more wake words that are associated with the subscribing assistant. Additionally, the subscription request may include information related to how much memory or other computer resources the subscribing assistant requires to operate. In some embodiments, the subscription request may indicate whether the subscribing assistant is configured to communicate via a Matter network and, if so, the subscription request may also include data related to communicating with the subscribing assistant via the Matter network. Furthermore, the subscription request may include other data that the voice assistant manager 104 may use when interacting with or managing the subscribing assistant. In some embodiments, the subscription request may include a plurality of communications between the subscribing assistant and the voice assistant manager 104 (e.g., the subscribing voice assistant may send the voice assistant manager 104 multiple data files that make up the subscription request).

At operation 404, the voice assistant manager 104 may update the assistant data 110. For example, the voice assistant manager 104 may add the subscribing assistant to the assistant data 110. Furthermore, the voice assistant manager 104 may alter data sets related to the assistant. For example, the voice assistant manager 104 may add the subscribing voice assistant to the category-VA data 112, in which the subscribing voice assistant may be linked to each category that the subscribing voice assistant is associated with. Furthermore, one or more data sets related to subcategory data may be altered to include the subscribing assistant. Furthermore, in response to determining that the subscribing voice assistant is associated with a new category (e.g., a category that the voice assistant manager 104 is not yet configured to detect, or a category that none of the existing voice assistants are associated with), then the voice assistant manager 104 may also add the new category to the voice assistant data 110. In some embodiments, the voice assistant manager 104 may also alter data related to wake words. For example, if the subscription request from the subscribing assistant includes a wake word, then the voice assistant manager 104 may include data indicating that the subscribing assistant is linked with that wake word.

At operation 406, the voice assistant manager 104 may update the category detection model 108. For example, if the subscription request includes a new category or subcategory, then the category detection model 108 may be trained to recognize the new category or subcategory. In some embodiments, the subscription request or subscribing assistant may provide training data. In some embodiments, an administrator of the voice assistant manager 104 or the subscribing assistant may provide training data. In some embodiments, even if the subscribing voice assistant is not associated with a new category or subcategory, the voice assistant manager 104 may nevertheless update the category detection model 108.

At operation 408, the voice assistant manager 104 may update the wake word detection model 252. For example, if the subscribing assistant includes one or more wake words, then the wake word detection model 252 may train to recognize the one or more wake words. In some embodiments, the subscription request or subscribing assistant may provide training data. In some embodiments, an administrator of the voice assistant manager 104 or the subscribing assistant may provide training data.

In some embodiments, by subscribing new voice assistants, the voice assistant manager 104 may increase the number of voice assistants that it interacts with. As a result, a user may have access to more voice assistants on the device 102. Furthermore, as new voice assistants are introduced, they may be seamlessly connected to the voice assistant manager 104 and interacted with by the user without displacing other voice assistants that are already present. Furthermore, aspects of the present disclosure may be used to manage changes to existing voice assistants. For example, if an existing voice assistant has a functionality or category added or removed, then the voice assistant manager 104 may alter the voice assistant data 110 and the category detection model 108 accordingly. Thus, in some embodiments, aspects of the present disclosure provide a flexible system that adapts to voice assistant changes without requiring behavioral changes or extensive effort from the user and without altering voice assistants that are not changing.

Figure 17:
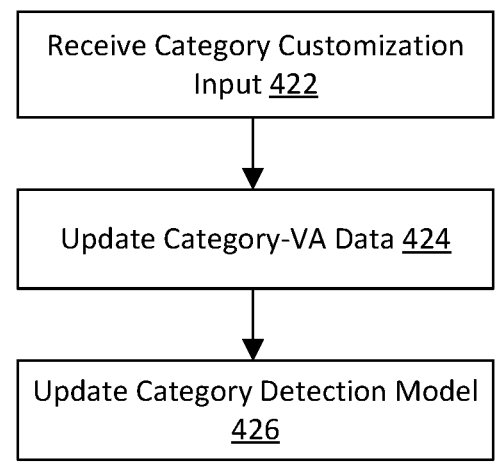
FIG. 17 is a flowchart of an example method for customizing a category.

FIG. 17 is a flowchart of an example method 420 for customizing a category. In some embodiments, the method 420 may be performed by the voice assistant manager 104. As described above, a voice assistant may be associated with a category. In some embodiments, a subscription request from a voice assistant may indicate a category associated with the voice assistant, or an operator or administrator of the voice assistant may determine the categories that the voice assistant is associated with. In some embodiments, a user of the device 102 or the voice assistant manager 104 may define a category and configure associations between categories and voice assistants, as illustrated by the method 420.

At operation 422, the voice assistant manager 104 may receive a category customization input. In some embodiments, the voice assistant manager 104 may cause the device 102 to display a user interface that includes one or more input fields for customizing a category, and the voice assistant manager 104 may receive the category customization input via the user interface. In some embodiments, the voice assistant manager 104 may receive a voice input from the user for customizing a category.

The category customization input may include one or more associations between a customized category and one or more voice assistants. The customized category may be a category that is already present in the voice assistant manager 104, or the category may be new. In some embodiments, the customized category in the category customization input may be a subcategory. In some embodiments, the category customization input may include a plurality of categories to customize.

At operation 424, the voice assistant manager 104 may update the category-VA data 112. For example, if the category customization input includes a customized category that is a new category or new subcategory, then the voice assistant manager 104 may add that category or subcategory to the voice assistant data 110. The voice assistant manager 104 may also data indicating which voice assistant—or voice assistants—are associated with the customized category.

At operation 426, the voice assistant manager 104 may update the category detection model 108. For example, if the customized category is a new category, then the voice assistant manager 104 may train the category detection model 108 to recognize when an utterance relates to the customized category. In some embodiments, the user—or another entity—may provide the voice assistant manager 104 with training data that includes utterances that relate to the customized category. In some embodiments, the user—or another entity—may provide the voice assistant manager 104 with one or more words related to the customized category and that, when detected in the utterance, may indicate that the utterance is related to the customized category. In some embodiments, the voice assistant manager 104 may use the one or more words as part of training the category detection model 108.

As an example application of the method 420, a user may customize a category called "Blinds," and may associate a first voice assistant (e.g., a voice assistant configured to operate a first set of blinds) and a second voice assistant (e.g., a voice assistant configured to operate a second set of blinds) with the customized category "Blinds." The voice assistant manager 104 may update the category-VA data 112—or subcategory data—to include the category "Blinds" and train the category detection model 108 to recognize when an utterance relates to "Blinds." Furthermore, as described above, the voice assistant manager 104 may be configured to broadcast an utterance related to "Blinds" to all assistants associated with "Blinds." Thus, when a user asks the device 102 or the voice assistant manager 104 to close or open blinds, then the voice assistant manager 104 may automatically detect the category "Blinds" and communicate the request to the appropriate assistant or assistants. As another example application of the method 420, a user may customize a category called "News" and may select a voice assistant to be associated with the "News" category. Thereafter, when the user sends a voice request related to news (e.g., "What are the top news stories today?"), then the voice assistant manager 104 may route that request to the assistant selected by the user to fulfill requests related to news. Furthermore, as another example, the user may only want a particular voice assistant to process and respond to utterances related to "Media." Therefore, the user may send a category customization input that removes other voice assistants from being associated with the category "Media."

As another example application of the method 420, and of other aspects of the present disclosure, a user may customize a category for "Going to Work." The user may associate a plurality of voice assistants to handle an utterance related to the category "Going to Work." As described above, the voice assistant manager 104 may communicate the utterance to each voice assistant that is associated with the category "Going to Work," and each voice assistant may perform an action in response to receiving the utterance. For example, in response to receiving an utterance related to "Going to Work," a first assistant may start a car; a second assistant may activate house alarms; a third assistant may order a coffee for pickup; and a fourth assistant may cause a device to read a work schedule for a day. Furthermore, in some embodiment, each of these four voice assistants may generate a response that may be output to a user (e.g., an audio file that may be synthesized by the device 102, resulting in output such as, "Okay, your car is warming up," "Sure, your house alarm will activate in five minutes," "Your drink at Coffee Town will be ready for pickup in 10 minutes," etc.).

Thus, in some embodiments, the user may configure which voice assistants process which types of voice requests. Therefore, aspects of the present disclosure include a way for users to implement their preferences with respect to what voice assistants are called when and for what requests. Furthermore, in some embodiments, the user may implement their preferences regarding voice assistants without using a wake word, a feature that may be particularly useful if one or more voice assistants do not have a wake word, if the user does not know the wake word for a voice assistant, or if the user wants to direct a request at more than one voice assistant.

Figure 18:
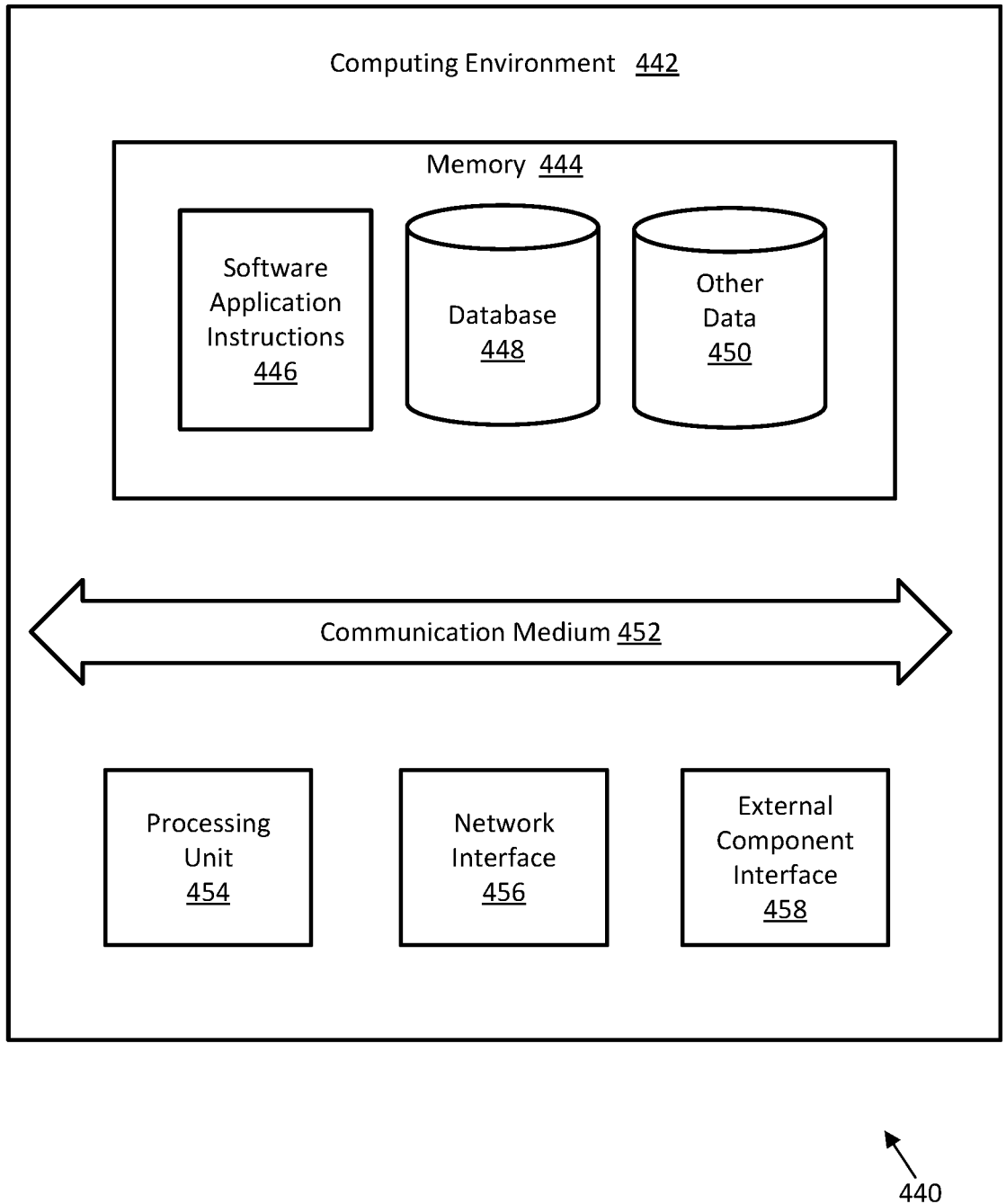
FIG. 18 illustrates a block diagram of an example computing system.

FIG. 18 illustrates an example system 440 with which disclosed systems and methods can be used. In an example, the following can be implemented in one or more systems 440 or in one or more systems having one or more components of system 440: the device 102, the voice assistant manager 104, the plurality of voice assistants 106a-d, the category detection model 108, the assistant data 110, the category-VA data 112, the device 200, the wake word detection model 252, the routing handler 254, the assistant subscription service 256, the subcategory data 270, the network 282, the cloud services 284a-d, and other aspects of the present disclosure.

In an example, the system 440 can include a computing environment 442. The computing environment 442 can be a physical computing environment, a virtualized computing environment, or a combination thereof. The computing environment 442 can include memory 444, a communication medium 452, one or more processing units 454, a network interface 456, and an external component interface 458.

The memory 444 can include a computer readable storage medium. The computer storage medium can be a device or article of manufacture that stores data and/or computer-executable instructions. The memory 444 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices or articles of manufacture that store data.

The memory 444 can store various types of data and software. For example, as illustrated, the memory 444 includes software application instructions 446, one or more databases 448, as well as other data 450. The communication medium 452 can facilitate communication among the components of the computing environment 442. In an example, the communication medium 452 can facilitate communication among the memory 444, the one or more processing units 454, the network interface 456, and the external component interface 458. The communication medium 452 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communication medium.

The one or more processing units 454 can include physical or virtual units that selectively execute software instructions, such as the software application instructions 446. In an example, the one or more processing units 454 can be physical products comprising one or more integrated circuits. The one or more processing units 454 can be implemented as one or more processing cores. In another example, one or more processing units 454 are implemented as one or more separate microprocessors. In yet another example embodiment, the one or more processing units 454 can include an application-specific integrated circuit (ASIC) that provides specific functionality. In yet another example, the one or more processing units 454 provide specific functionality by using an ASIC and by executing computer-executable instructions.

The network interface 456 enables the computing environment 442 to send and receive data from a communication network. The network interface 456 can be implemented as an Ethernet interface, a token-ring network interface, a fiber optic network interface, a wireless network interface (e.g., Wi-Fi), a Bluetooth interface, an interface for sending or receiving communications pursuant to the Matter protocol, or another type of network interface.

The external component interface 458 enables the computing environment 442 to communicate with external devices. For example, the external component interface 458 can be a USB interface, Thunderbolt interface, a Lightning interface, a serial port interface, a parallel port interface, a PS/2 interface, or another type of interface that enables the computing environment 442 to communicate with external devices. In various embodiments, the external component interface 458 enables the computing environment 442 to communicate with various external components, such as external storage devices, input devices, speakers, modems, media player docks, other computing devices, scanners, digital cameras, and fingerprint readers.

Although illustrated as being components of a single computing environment 442, the components of the computing environment 442 can be spread across multiple computing environments 442. For example, one or more of instructions or data stored on the memory 444 may be stored partially or entirely in a separate computing environment 442 that is accessed over a network.

While particular uses of the technology have been illustrated and discussed above, the disclosed technology can be used with a variety of data structures and processes in accordance with many examples of the technology. The above discussion is not meant to suggest that the disclosed technology is only suitable for implementation with the components and operations shown and described above.

This disclosure described some aspects of the present technology with reference to the accompanying drawings, in which only some of the possible aspects were shown. Other aspects can, however, be embodied in different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method for processing voice input from a user, the method comprising:
   receiving an utterance from the user at a computing device;
   detecting a wake word in the utterance;
   based at least in part on the wake word, identifying a called assistant from a plurality of voice assistants;
   communicating the utterance to the called assistant;
   determining a category of the utterance from a plurality of categories, wherein determining the category of the utterance is performed in response to receiving an error from the called assistant;
   selecting an assistant from the plurality of voice assistants;
   communicating the utterance to the selected assistant; and
   transmitting a response from the selected assistant to the user,
   wherein selecting the assistant from the plurality of voice assistants comprises determining that the selected assistant is associated with the category.

2. The method of claim 1, further comprising detecting a subcategory of the utterance;
   wherein selecting the assistant from the plurality of voice assistants further comprises determining that the selected assistant is associated with the subcategory.

3. The method of claim 1, further comprising detecting an action of the utterance;
   wherein selecting the assistant from the plurality of voice assistants further comprises determining that the selected assistant is associated with the action.

4. The method of claim 1, further comprising, prior to communicating the utterance to the selected assistant:
   transmitting a communication to the user, wherein the communication requests permission to transmit the utterance to the selected assistant; and
   receiving a confirmation from the user.

5. The method of claim 1, further comprising:
   identifying, from the plurality of voice assistants, a plurality of voice assistants associated with the category; and
   communicating the utterance to each of the plurality of voice assistants associated with the category.

6. The method of claim 1, wherein selecting the assistant from the plurality of voice assistants further comprises:
   identifying, from the plurality of voice assistants, multiple voice assistants associated with the category; and
   selecting the assistant from the multiple voice assistants associated with the category.

7. The method of claim 6, wherein selecting the assistant from the multiple voice assistants associated with the category comprises selecting the assistant based on a popularity of the selected assistant at a time of day.

8. The method of claim 1, further comprising receiving a category customization input;
   wherein the category customization input includes:
   a customized category; and
   one or more voice assistants of the plurality of voice assistants.

9. The method of claim 1, further comprising, prior to selecting the assistant from the plurality of voice assistants, receiving a subscription request from the selected assistant, the subscription request including one or more categories associated with the selected assistant.

10. The method of claim 1, wherein each voice assistant of the plurality of voice assistants is installed on the computing device.

11. The method of claim 1, wherein determining the category of the utterance comprises inputting the utterance into a category detection model; and
    wherein the category detection model is a machine learning model trained to recognize one or more categories of the plurality of categories.

12. A device for processing voice input, the device comprising:
    a processor; and
    memory storing instructions that, when executed by the processor, cause the device to:
    receive an utterance from a user;
    detect a wake word in the utterance;
    based at least in part on the wake word, identify a called assistant from a plurality of voice assistants;
    communicate the utterance to the called assistant;
    determine, from a plurality of categories, a category of the utterance, wherein determining the category of the utterance is performed in response to receiving an error from the called assistant;
select an assistant from the plurality of voice assistants; and
communicate the utterance to the selected assistant,
wherein selecting the assistant from the plurality of assistants comprises determining that the selected assistant is associated with the category.

13. The device of claim 12, wherein the instructions, when executed by the processor, further cause the device to, prior to communicating the utterance to the selected assistant, transmit a communication to the user, the communication including information related to the selected assistant.

14. A device for processing a voice utterance, the device comprising:
a voice assistant manager;
a plurality of voice assistants;
a processor; and
memory coupled to the processor, wherein the memory stores instructions that, when executed by the processor, cause the voice assistant manager to:
receive the utterance from a user;
detect a wake word in the utterance;
based at least in part on the wake word, identify a called assistant from a plurality of voice assistants;
communicate the utterance to the called assistant;
determine a category of the utterance, wherein determining the category of the utterance is performed in response to receiving an error from the called assistant;
select an assistant from the plurality of voice assistants, wherein the assistant is associated with the category; and
communicate the utterance to the selected assistant,
wherein the instructions, when executed by the processor, cause the selected assistant to receive the utterance and to generate a response to the utterance.

15. The device of claim 14, wherein the instructions, when executed by the processor, further cause the voice assistant manager to select, from the plurality of voice assistants, multiple voice assistants associated with the category; and
wherein selecting the assistant from the plurality of voice assistants comprises selecting the assistant from the multiple voice assistants associated with the category.

* * * * *